US012330871B2

(12) United States Patent
Sakali et al.

(10) Patent No.: US 12,330,871 B2
(45) Date of Patent: Jun. 17, 2025

(54) ADAPTIVE AUTOMATED GUIDED VEHICLES AND METHODOLOGIES OF OPERATION

(71) Applicant: INTELLIGRATED HEADQUARTERS, LLC, Mason, OH (US)

(72) Inventors: Vinod Kumar Sakali, Hyderabad (IN); Ravi Kumar Avupati, Hyderabad (IN); Saravanan Sadasivan, Bangalore (IN)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 854 days.

(21) Appl. No.: 17/453,515

(22) Filed: Nov. 4, 2021

(65) Prior Publication Data

US 2023/0080839 A1     Mar. 16, 2023

(30) Foreign Application Priority Data

Sep. 14, 2021   (IN) .............................. 202111041206

(51) Int. Cl.
*B65G 1/127*     (2006.01)
*B65G 1/137*     (2006.01)
(Continued)

(52) U.S. Cl.
CPC ............. *B65G 1/137* (2013.01); *B65G 47/57* (2013.01); *B66F 9/063* (2013.01); *B66F 9/12* (2013.01); *G05D 1/0225* (2013.01)

(58) Field of Classification Search
CPC ........ B65G 1/137; B65G 47/57; B65G 1/127; B65G 65/00; B66F 9/063; B66F 9/12; G05D 1/0225; G05D 1/0297
See application file for complete search history.

(56) References Cited

U.S. PATENT DOCUMENTS

2005/0099553 A1* 5/2005 Wu ........................ B60K 35/10
349/58
2008/0008568 A1* 1/2008 Harris ...................... B65G 1/06
414/281
(Continued)

FOREIGN PATENT DOCUMENTS

JP          10305996 A  * 11/1998
WO    WO-2019089923 A1 *  5/2019  ........... B65G 1/0435

OTHER PUBLICATIONS

JP-10305996-A, "Vehicle for Industrial Use", Kondo Hidehito. (Year: 1998).*

(Continued)

*Primary Examiner* — Ernesto A Suarez
*Assistant Examiner* — Laurence R Brothers
(74) *Attorney, Agent, or Firm* — Alston & Bird LLP

(57) ABSTRACT

Embodiments of the present disclosure provide adaptive autonomous guided vehicles capable of performing a myriad of specialized task operations. Some embodiments include a base vehicle, a vertical carousel including at least one carousel conveyor shelf, where the vertical carousel is affixable to a top of the based vehicle, and a rotatable top conveyor affixable to a top of the vertical carousel. Some embodiments include processing circuitry communicatively coupled to with each of the base vehicle, the vertical carousel, and the rotatable top conveyor, where the processing circuitry executes computer-coded instructions that at least partially cause the processing circuitry to control each of the base vehicle, the vertical carousel, and/or the rotatable top conveyor. The processing circuitry controls such components to perform any of a number of specific task operations. Some embodiments align multiple adaptive autonomous guided vehicles that interact to perform specific task operation(s).

20 Claims, 17 Drawing Sheets

(51) Int. Cl.
*B65G 47/57* (2006.01)
*B65G 65/00* (2006.01)
*B66F 9/06* (2006.01)
*B66F 9/12* (2006.01)
*G05D 1/00* (2006.01)

(56) References Cited

U.S. PATENT DOCUMENTS

| | | | |
|---|---|---|---|
| 2014/0090955 A1* | 4/2014 | Aillon | B65G 47/50 198/369.1 |
| 2016/0132059 A1* | 5/2016 | Mason | B25J 9/1697 701/28 |
| 2016/0256898 A1* | 9/2016 | Alsop, Sr. | B07C 7/04 |
| 2019/0196505 A1* | 6/2019 | High | G06Q 10/083 |
| 2020/0102147 A1* | 4/2020 | Sullivan | B65G 1/1375 |
| 2020/0326696 A1* | 10/2020 | Alvarez | G05B 23/0281 |

OTHER PUBLICATIONS

"Hangcha J Series Counterbalanced Battery Forklift Truck Operation and Maintenance Manual", Hangcha (Year: 2010).*

* cited by examiner

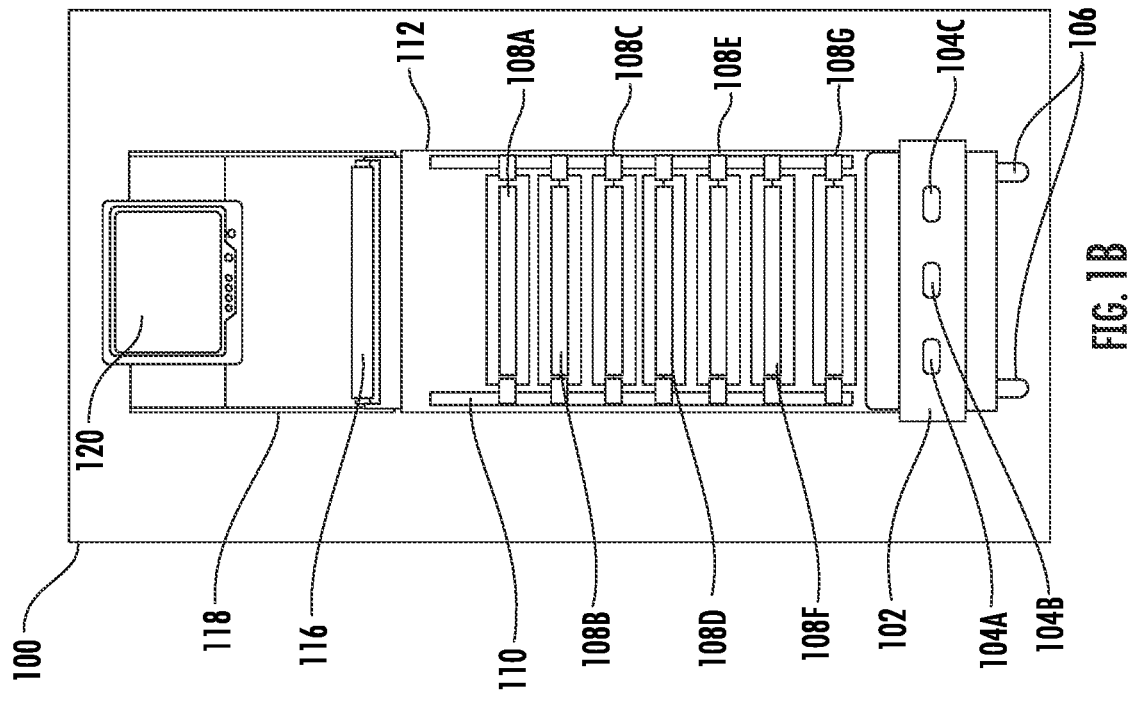
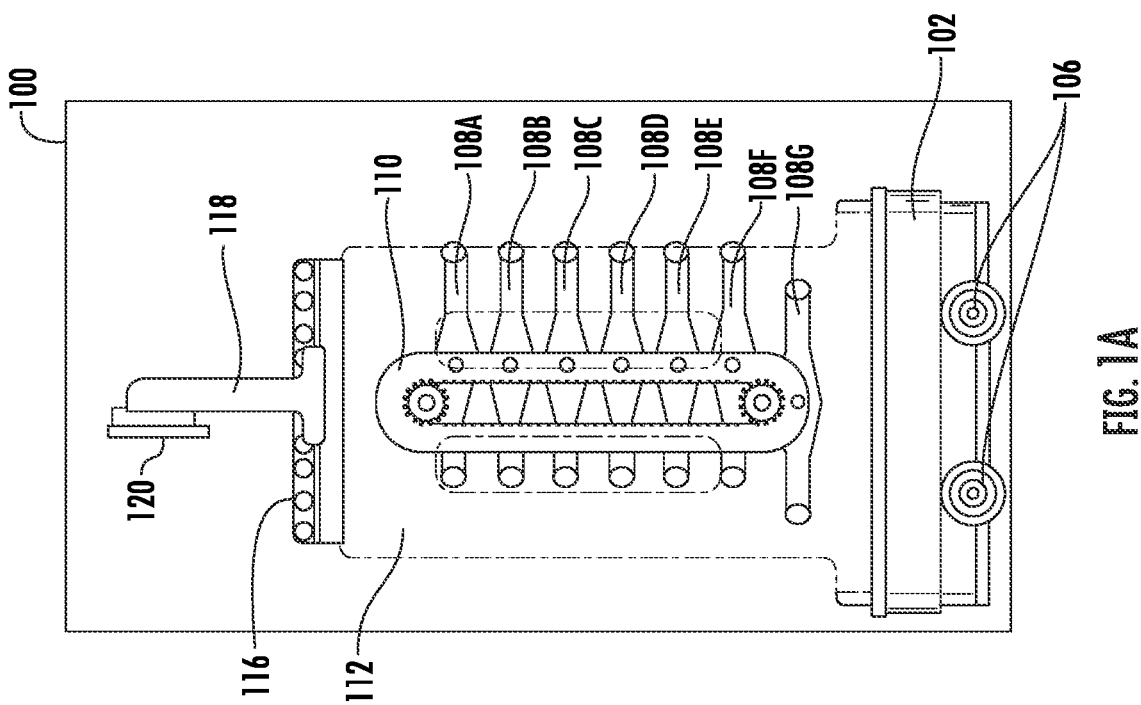

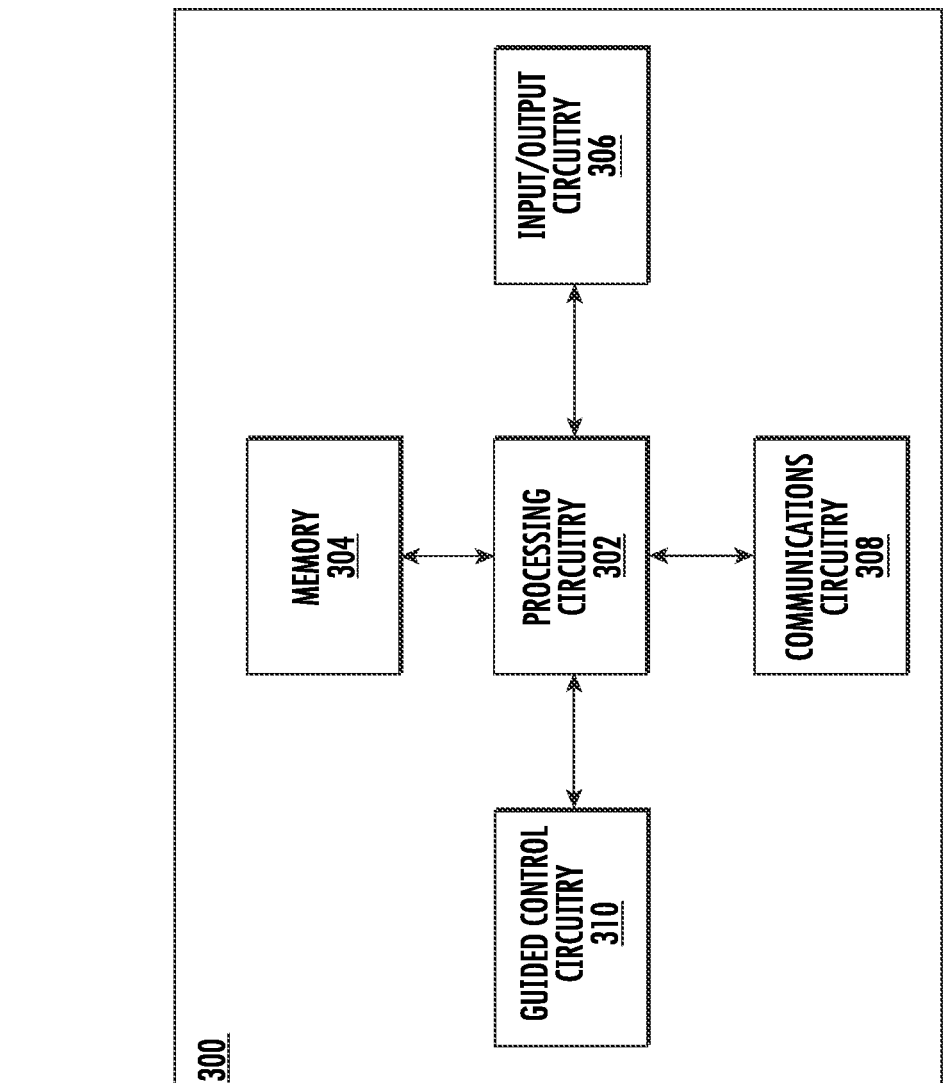
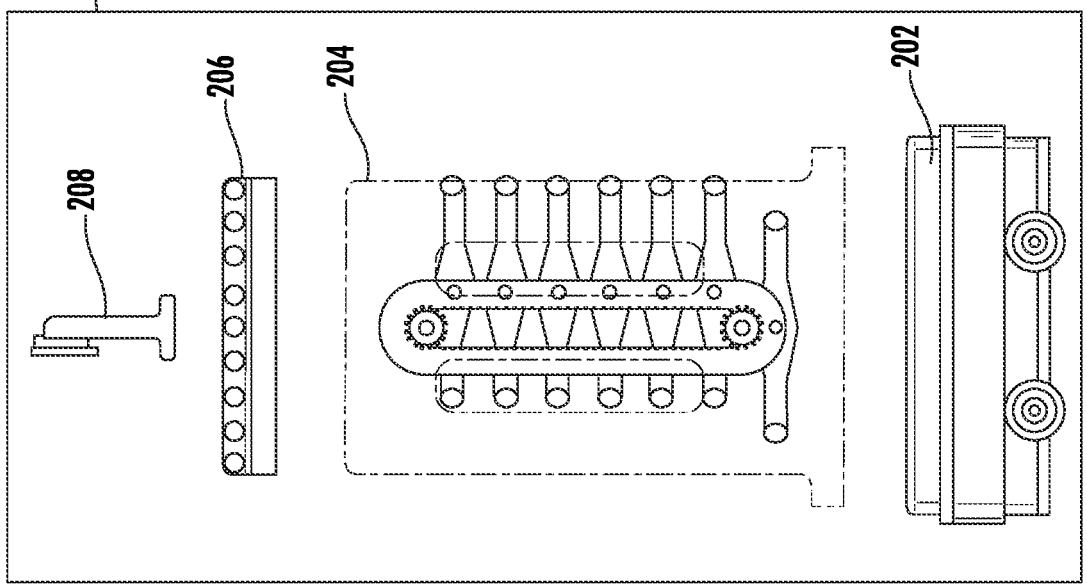

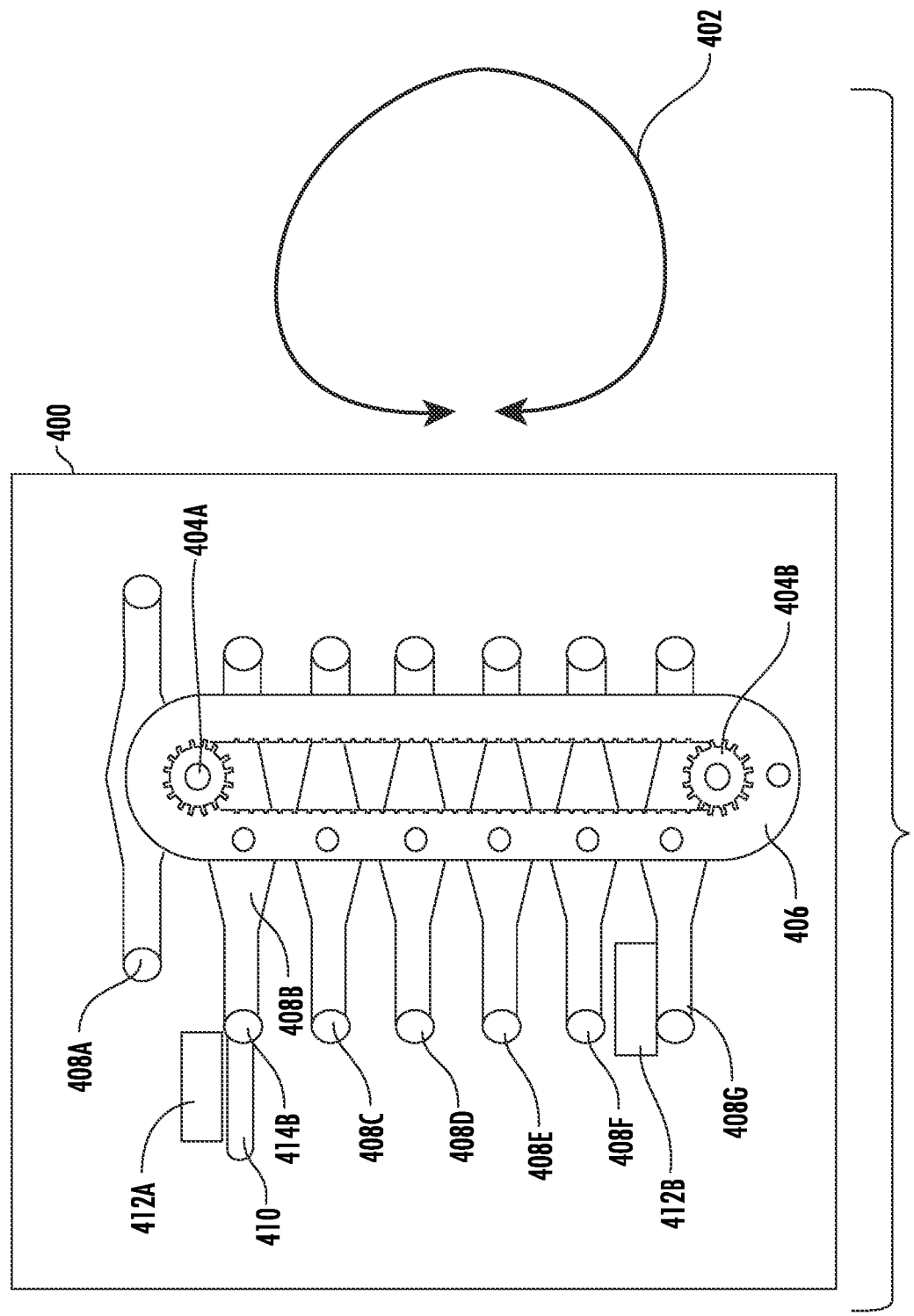

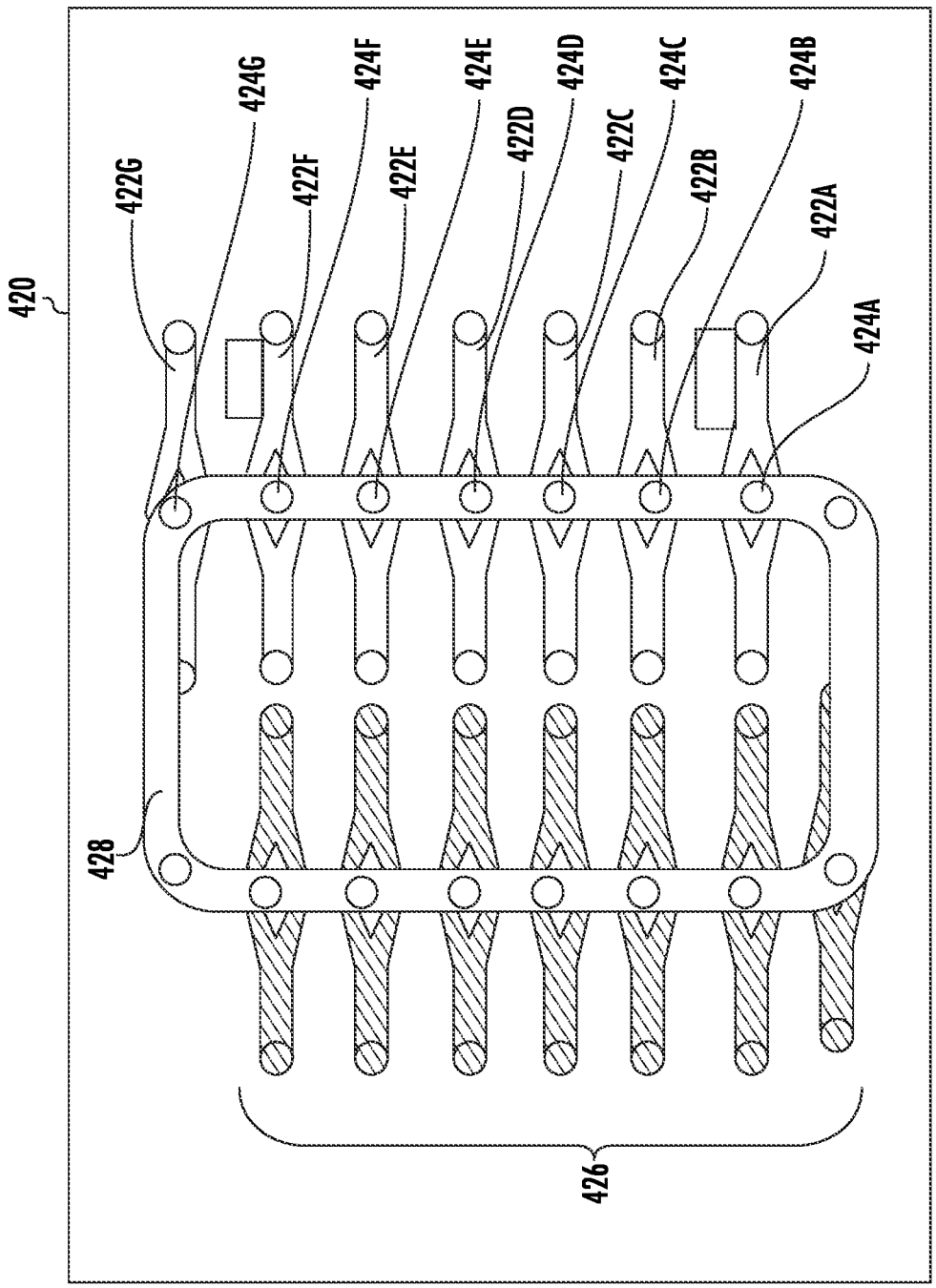

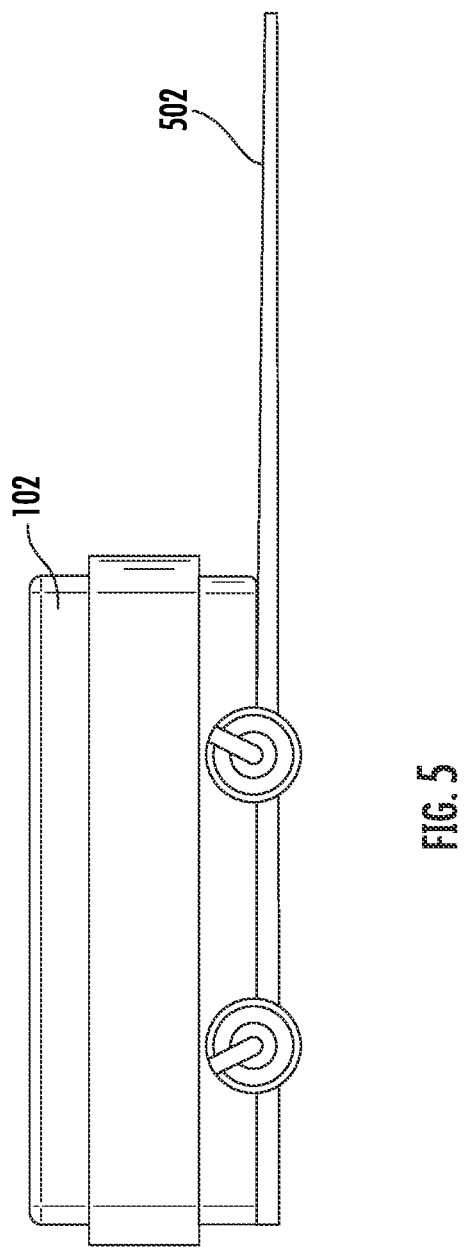

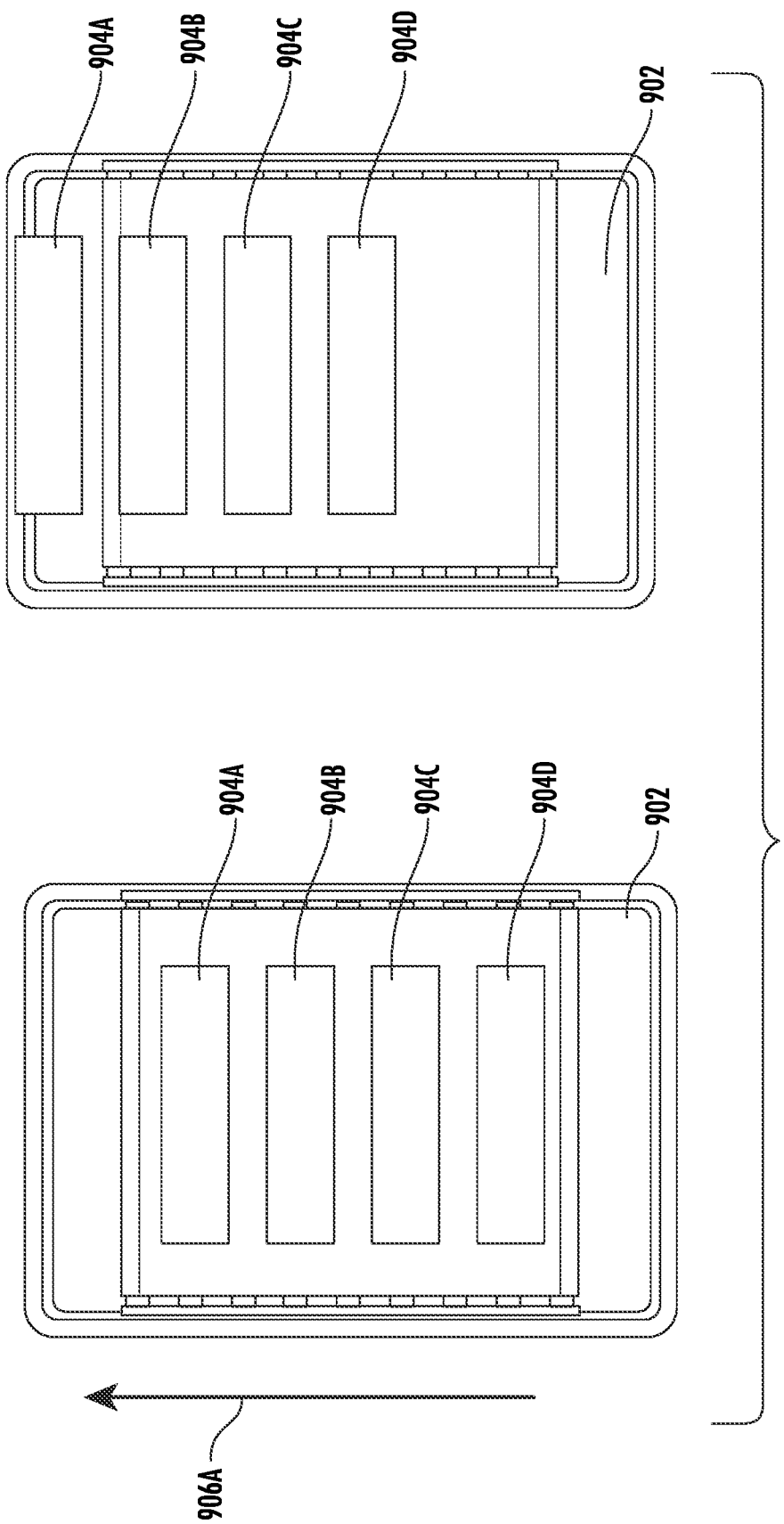

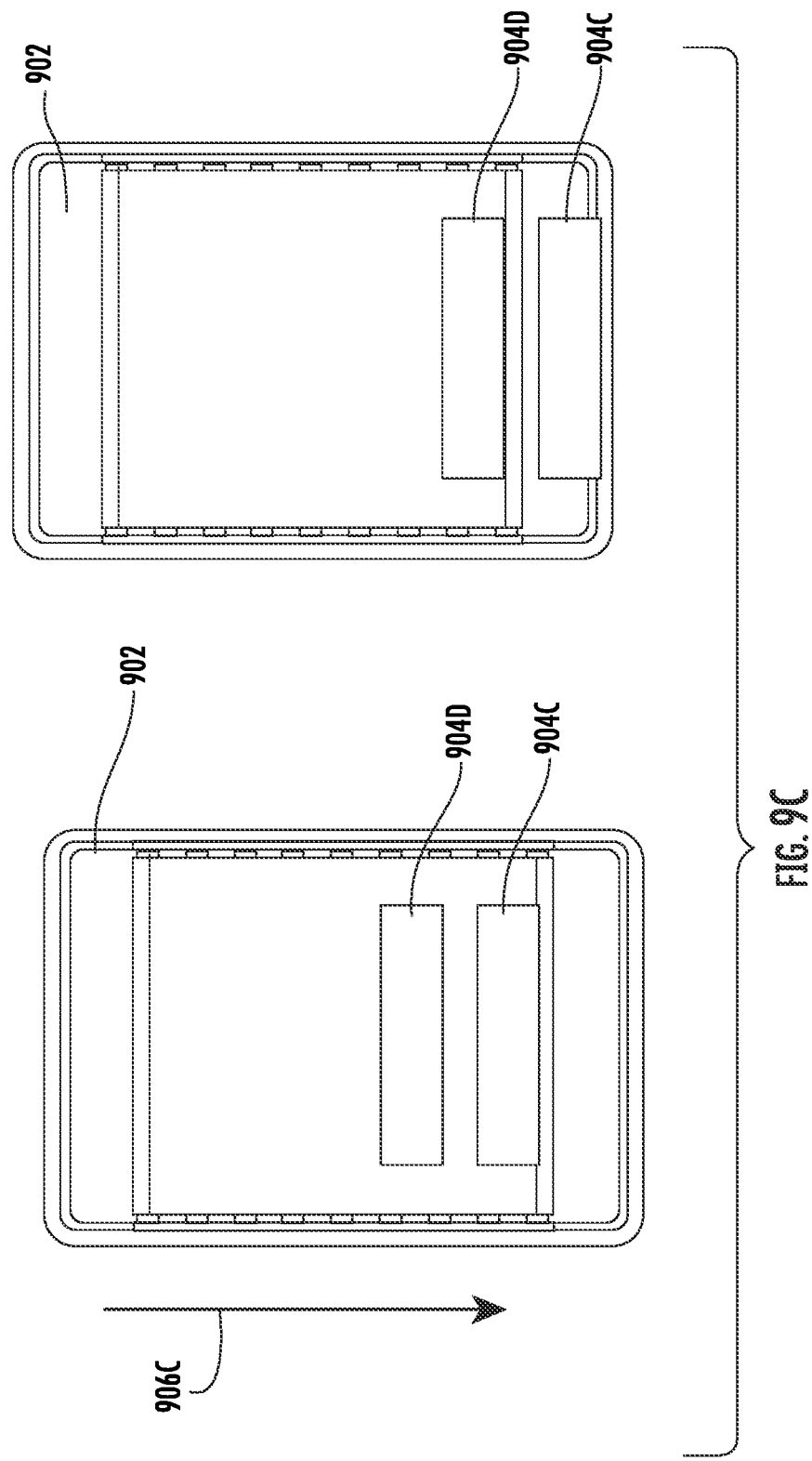

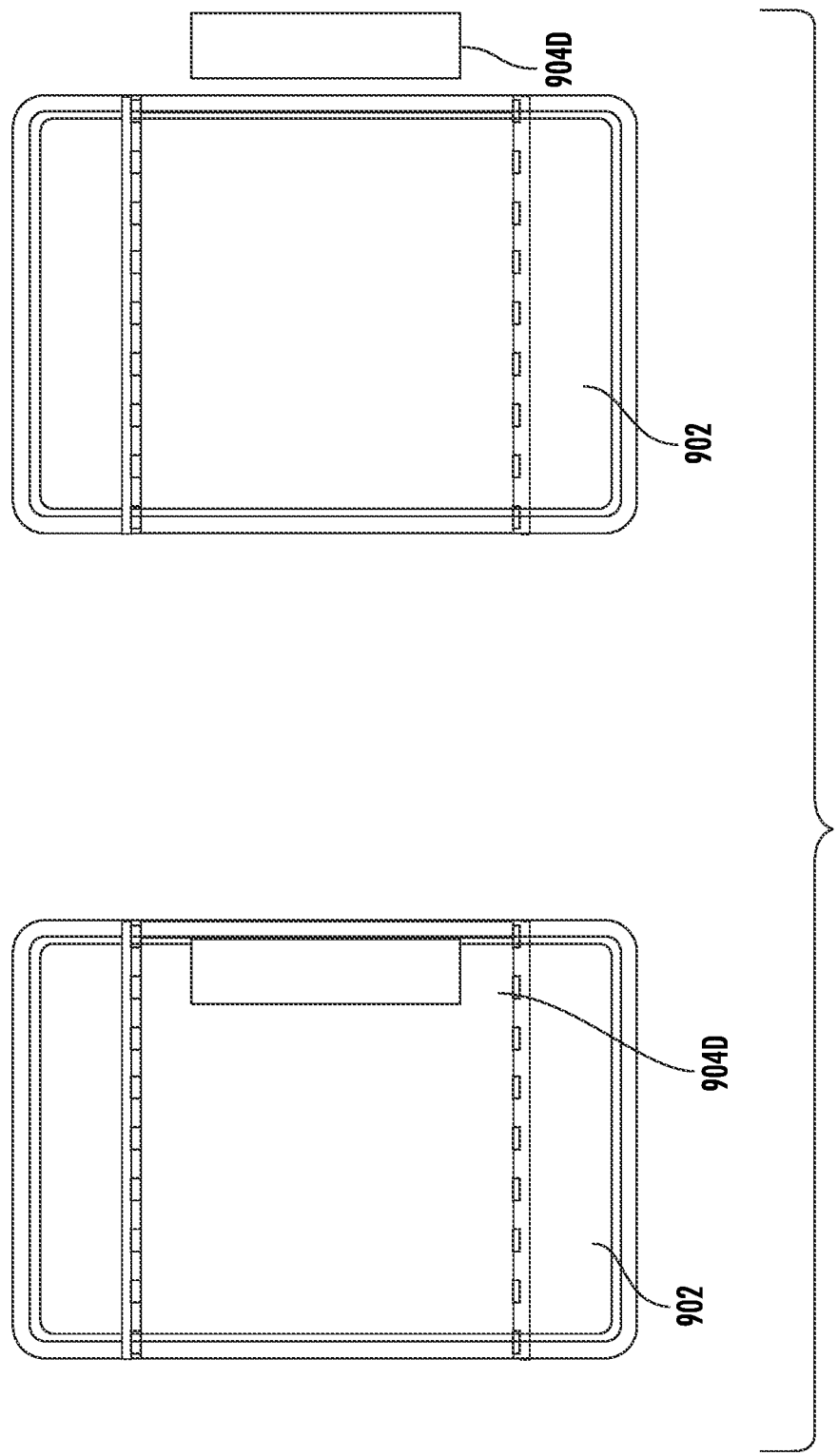

ADAPTIVE AUTOMATED GUIDED VEHICLES AND METHODOLOGIES OF OPERATION

TECHNOLOGICAL FIELD

Embodiments of the present disclosure generally relate to autonomous vehicles, and specifically to adaptive automated guided vehicles that include mechanisms for performing a myriad of task operations.

BACKGROUND

Autonomous and/or semi-autonomous vehicles are utilized in a myriad of contexts. Often, such vehicles include specialized mechanisms for performing one specialized task. The specialized vehicles may work in conjunction with one another to accomplish individual portions of tasks, handing off items to one another and/or otherwise interacting after each specialized portion of a task is performed. Applicant has discovered problems with current implementations of autonomous vehicles. Through applied effort, ingenuity, and innovation, Applicant has solved many of these identified problems by developing embodied in the present disclosure, which are described in detail below.

BRIEF SUMMARY

In general, embodiments of the present disclosure provided herein provide adaptive autonomous guided vehicles for performing a variety of specialized tasks. Other implementations of adaptive autonomous guided vehicles for performing a variety of specialized tasks will be, or will become, apparent to one with skill in the art upon examination of the following figures and detailed description. It is intended that all such additional implementations be included within this description be within the scope of the disclosure, and be protected by the following claims.

In accordance with one aspect of the present disclosure, an adaptive autonomous guided vehicle is provided. The adaptive autonomous guided vehicle is capable of performing any of a myriad of specialized task operations, including item picking, item onboarding, item offloading, item sorting, item transportation, and the like. One example adaptive autonomous guided vehicle includes a base vehicle. The example adaptive autonomous guided vehicle further includes a vertical carousel including at least one carousel conveyor shelf, the vertical carousel affixable to a top of the base vehicle. One example adaptive autonomous guided vehicle includes a base vehicle. The example adaptive autonomous guided vehicle further includes a rotatable top conveyor affixable to a top of the vertical carousel. One example adaptive autonomous guided vehicle includes a base vehicle. The example adaptive autonomous guided vehicle further includes processing circuitry communicatively coupled with each of the base vehicle, the vertical carousel, and the rotatable top conveyor, where the processing circuitry executes computer-coded instructions that at least partially cause the processing circuitry to at least partially control each of the base vehicle, the vertical carousel, and the rotatable top conveyor.

Additionally or alternatively, in some embodiments of the example adaptive autonomous guided vehicle, the processing circuitry is further caused to receive control instructions to align with at least one other adaptive autonomous guided vehicle, and align the rotatable top conveyor of the adaptive autonomous guided vehicle with at least one other rotatable top conveyor of the at least one other adaptive autonomous guided vehicle by at least utilizing the base vehicle to position the adaptive autonomous guided vehicle at a target position.

Additionally or alternatively, in some such embodiments of the example adaptive autonomous guided vehicle, the target position indicates a position in side-by-side alignment with the at least one other adaptive autonomous guided vehicle side-by-side.

Additionally or alternatively, in some such embodiments of the example adaptive autonomous guided vehicle, the target position indicates a position in forward-facing alignment with the at least one other adaptive autonomous guided vehicle.

Additionally or alternatively, in some such embodiments of the example adaptive autonomous guided vehicle, to align the rotatable top conveyor of the adaptive autonomous guided vehicle with the at least one other rotatable top conveyor of the at least one other adaptive autonomous guided vehicle, the processing circuitry is further caused to rotate the rotatable top conveyor to a target rotation.

Additionally or alternatively, in some such embodiments of the example adaptive autonomous guided vehicle, the adaptive autonomous guided vehicle further comprising at least one environment sensor, each environment sensor of the at least one environment sensor housed in or fixedly attached to the base vehicle, the vertical carousel, or the rotatable top conveyor, and the processing circuitry is further caused to retrieve real-time sensor data from the at least one environment sensor; and generate control instructions for the base vehicle based at least in part on the real-time sensor data.

Additionally or alternatively, in some such embodiments of the example adaptive autonomous guided vehicle, the processing circuitry is further caused to manipulate the vertical carousel to position the at least one carousel conveyor shelf based at least in part on a balanced center of gravity determined for a current load distribution applied to the vertical carousel.

Additionally or alternatively, in some embodiments of the example adaptive autonomous guided vehicle, the adaptive autonomous guided vehicle further comprising a display fixedly attached to the rotatable top conveyor to define an area through which an object may traverse along the rotatable top conveyor.

Additionally or alternatively, in some such embodiments of the example adaptive autonomous guided vehicle, the processing circuitry is communicatively coupled with the display monitor to cause output of display data via the display.

Additionally or alternatively, in some embodiments of the example adaptive autonomous guided vehicle, each carousel conveyor shelf of the at least one carousel conveyor shelf comprises an unobstructed space between a first end of the carousel conveyor shelf and a second end of the carousel conveyor shelf.

Additionally or alternatively, in some embodiments of the example adaptive autonomous guided vehicle, each carousel conveyor shelf of the at least one carousel conveyor shelf comprises an extendable slide controlled by a motor.

Additionally or alternatively, in some embodiments of the example adaptive autonomous guided vehicle, the base vehicle comprises forklift arms.

Additionally or alternatively, in some embodiments of the example adaptive autonomous guided vehicle, the processing circuitry is further caused to align a first carousel conveyor shelf of the vertical carousel with a second carousel conveyor shelf of a second vertical carousel of another adaptive autonomous guided vehicle; and activate the first carousel conveyor shelf to traverse an object engaged with the first carousel conveyor shelf to the second carousel conveyor shelf.

Additionally or alternatively, in some embodiments of the example adaptive autonomous guided vehicle, the processing circuitry is further caused to rotate a first carousel conveyor shelf of the vertical carousel to a particular rotation; align the first carousel conveyor shelf of the vertical carousel with a target position; and activate the first carousel conveyor shelf to traverse an object engaged with the first carousel conveyor shelf to the target position.

Additionally or alternatively, in some embodiments of the example adaptive autonomous guided vehicle, the base vehicle comprises retractable forklift arms, and wherein the processing circuitry is further caused to control the base vehicle to engage at least one object utilizing the retractable forklift arms; determine the at least one object impedes at least one space associated with the vertical carousel; and control the adaptive autonomous guided vehicle for offloading the at least one object engaged by the retractable forklift arms before offloading a second at least one object engaged by the vertical carousel.

Additionally or alternatively, in some embodiments of the example adaptive autonomous guided vehicle, the base vehicle comprises retractable forklift arms, and wherein the processing circuitry is further caused to control the base vehicle to engage at least one object utilizing the retractable forklift arms; determine the at least one object impedes at least one space associated with the vertical carousel; and rotate the vertical carousel to position the at least one carousel conveyor shelf aligned with an unobstructed space.

Additionally or alternatively, in some embodiments of the example adaptive autonomous guided vehicle, the processing circuitry is further caused to detect an object engaged at a first end of a first carousel conveyor shelf; activate the first carousel conveyor shelf to traverse the object towards a second end of the first carousel conveyor shelf; and extend a first extendable slide at the second end of the first carousel conveyor shelf, where the object traverses along the first extendable slide during offloading from the first extendable slide.

Additionally or alternatively, in some embodiments of the example adaptive autonomous guided vehicle, the processing circuitry is further caused to control the base vehicle to traverse to a reconfiguration location; and cause activation of a reconfiguration system, where the reconfiguration system engages the adaptive autonomous guided vehicle to remove the rotatable top conveyor and/or the vertical carousel.

In accordance with a second aspect of the present disclosure, a second example adaptive automated guided vehicle is provided. The second example adaptive automated guided vehicle includes a base vehicle comprising retractable forklift arms. The second example adaptive automated guided vehicle further includes a vertical carousel comprising at least one carousel conveyor shelf, the vertical carousel affixable to a top of the base vehicle. The second example adaptive automated guided vehicle further includes a rotatable top conveyor affixable to a top of the vertical carousel. The second example adaptive automated guided vehicle further includes at least one environment sensor, each environment sensor of the at least one environment sensor housed in or fixedly attached to the base vehicle, the vertical carousel, or the rotatable top conveyor. The second example adaptive automated guided vehicle further includes processing circuitry communicatively coupled with each of the base vehicle, the vertical carousel, and the rotatable top conveyor, where the processing circuitry executes computer-coded instructions that cause the processing circuitry to rotate the rotatable top conveyor to a first direction associated with a first object type; activate the rotatable top conveyor to traverse a first object in a first direction; rotate the rotatable top conveyor to a second direction associated with a second object type; and activate the rotatable top conveyor to traverse a second object in a second direction.

In accordance with a third aspect of the present disclosure, a third example adaptive automated guided vehicle is provided. The third example adaptive automated guided vehicle includes a base vehicle comprising retractable forklift arms. The third example adaptive automated guided vehicle further includes a vertical carousel comprising at least one carousel conveyor shelf, the vertical carousel affixable to a top of the base vehicle. The third example adaptive automated guided vehicle further includes a rotatable top conveyor affixable to a top of the vertical carousel. The third example adaptive automated guided vehicle further includes at least one environment sensor, each environment sensor of the at least one environment sensor housed in or fixedly attached to the base vehicle, the vertical carousel, or the rotatable top conveyor. The third example adaptive automated guided vehicle further includes processing circuitry communicatively coupled with each of the base vehicle, the vertical carousel, and the rotatable top conveyor, where the processing circuitry executes computer-coded instructions that cause the processing circuitry to retrieve real-time sensor data from the at least one environment sensor; apply the real-time sensor data to a perception model; and at least partially control each of the base vehicle, the vertical carousel, and/or the rotatable top conveyor based at least in part on applying the real-time sensor data to the perception model.

In accordance with a fourth aspect of the disclosure, a computer-implemented method for controlling an adaptive autonomous guided vehicle is provided. The computer-implemented method may be executed by hardware, software, firmware, and/or the like of an adaptive autonomous guided vehicle as described herein. An example computer-implemented method includes receiving control instructions for aligning with one or more other AAGVs. The example computer-implemented method further includes capturing a data set representing an environment. The example computer-implemented method further includes processing the data set to maneuver in alignment with a first AAGV of the one or more other AAGVs. The example computer-implemented method further includes activating a rotatable top conveyor.

In accordance with a fifth aspect of the disclosure, an apparatus for controlling an adaptive autonomous guided vehicle is provided. An example apparatus may include at least one processor and at least one memory having computer-coded instructions stored thereon. The computer-coded instructions, in execution with the at least one processor, cause the apparatus to perform any of the computer-implemented methods described herein. Another example apparatus includes means for performing each step of any one of the computer-implemented methods described herein.

In accordance with a sixth aspect of the disclosure, a computer program product for controlling an adaptive autonomous guided vehicle is provided. An example computer program product includes at least one non-transitory computer-readable storage medium. The non-transitory computer-readable storage medium includes computer program code stored thereon that, in execution with at least one processor, configures the computer program product for performing any one of the computer-implemented methods described herein.

BRIEF DESCRIPTION OF THE DRAWINGS

Figure 1C:
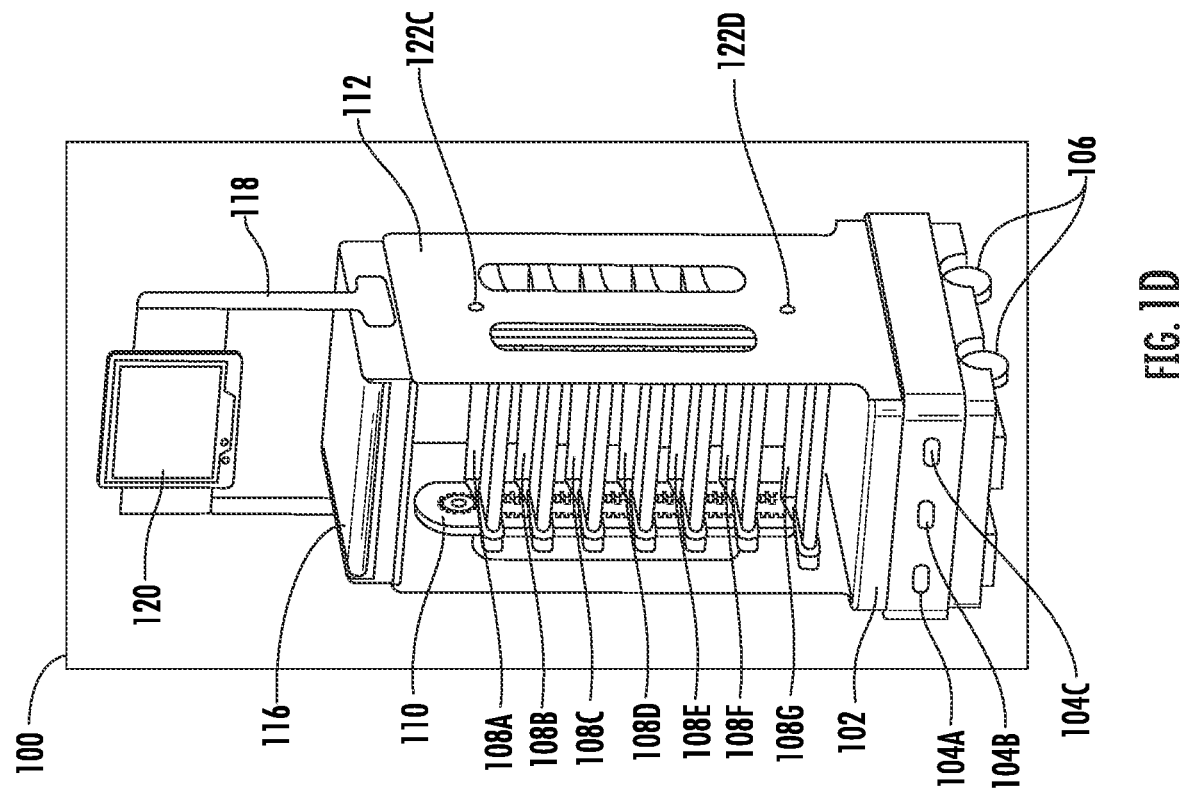
Figure 1D:
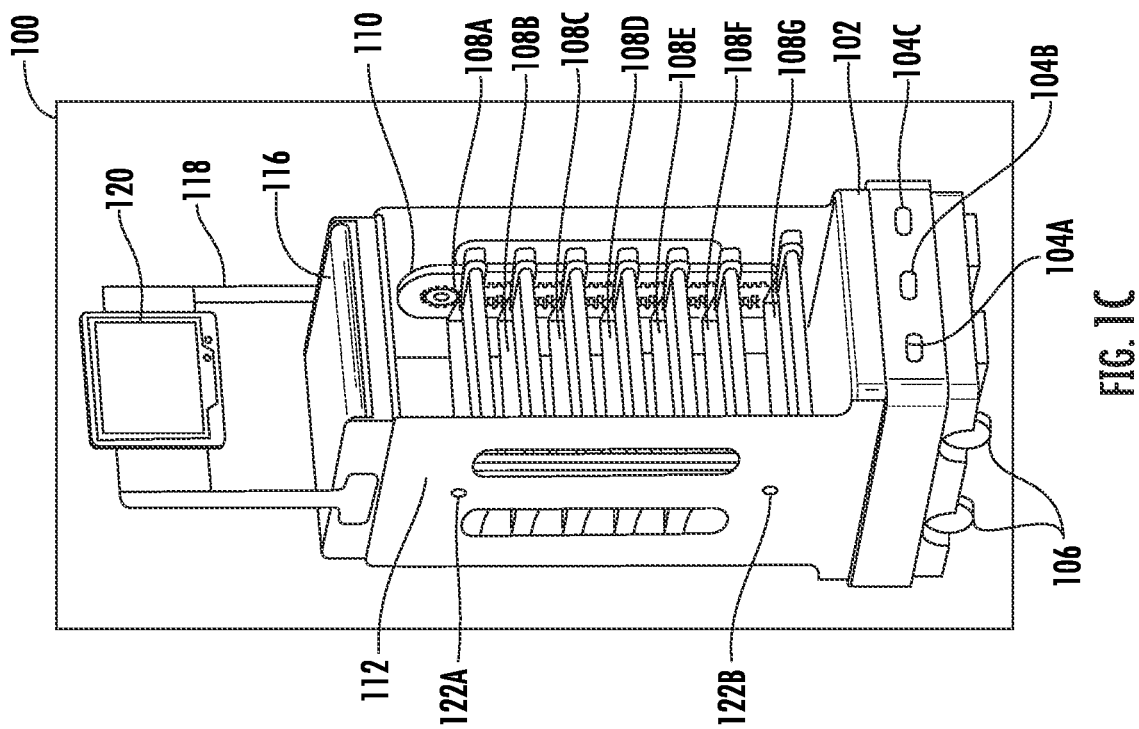
Figure 4C:
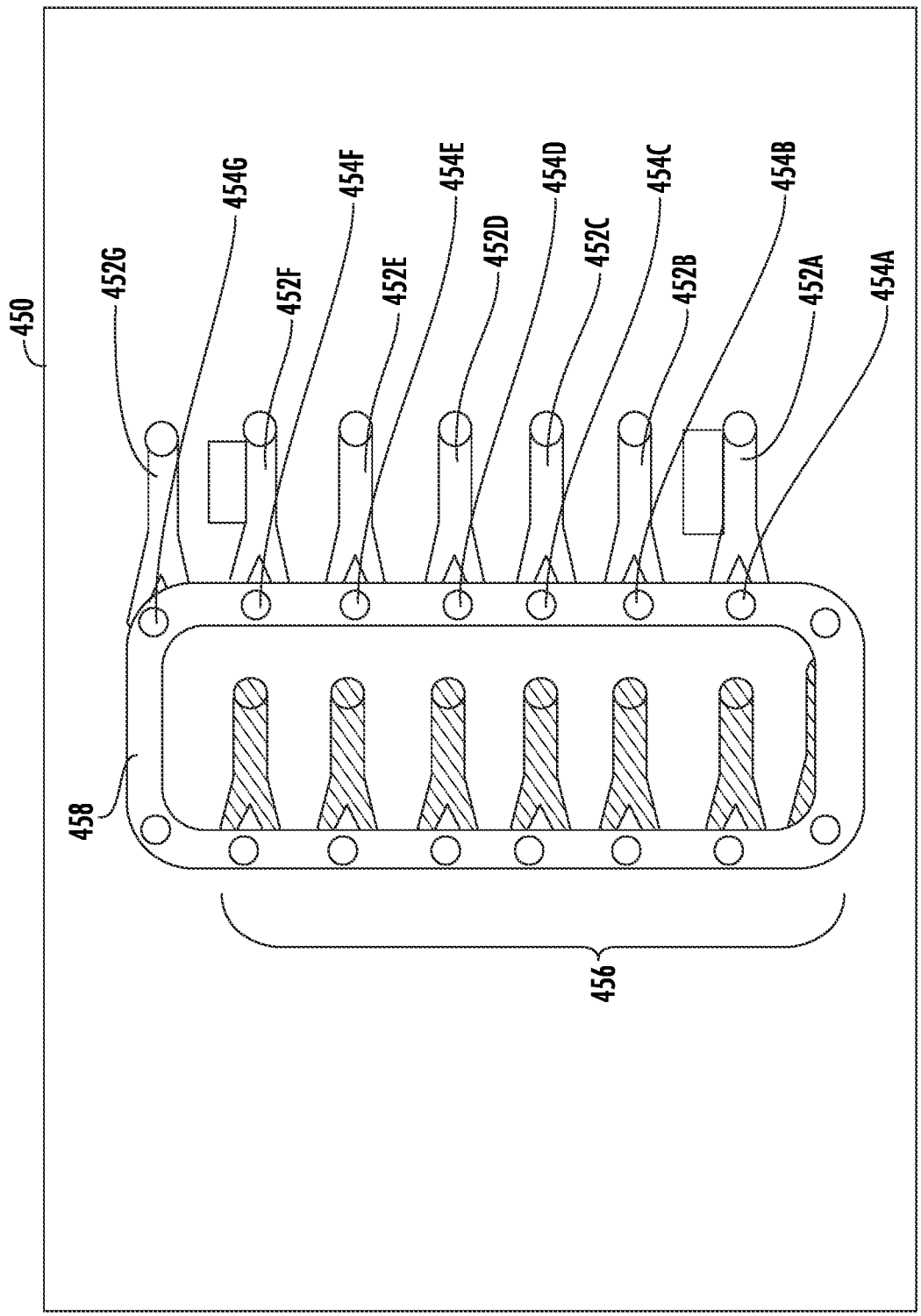
Figure 6A:
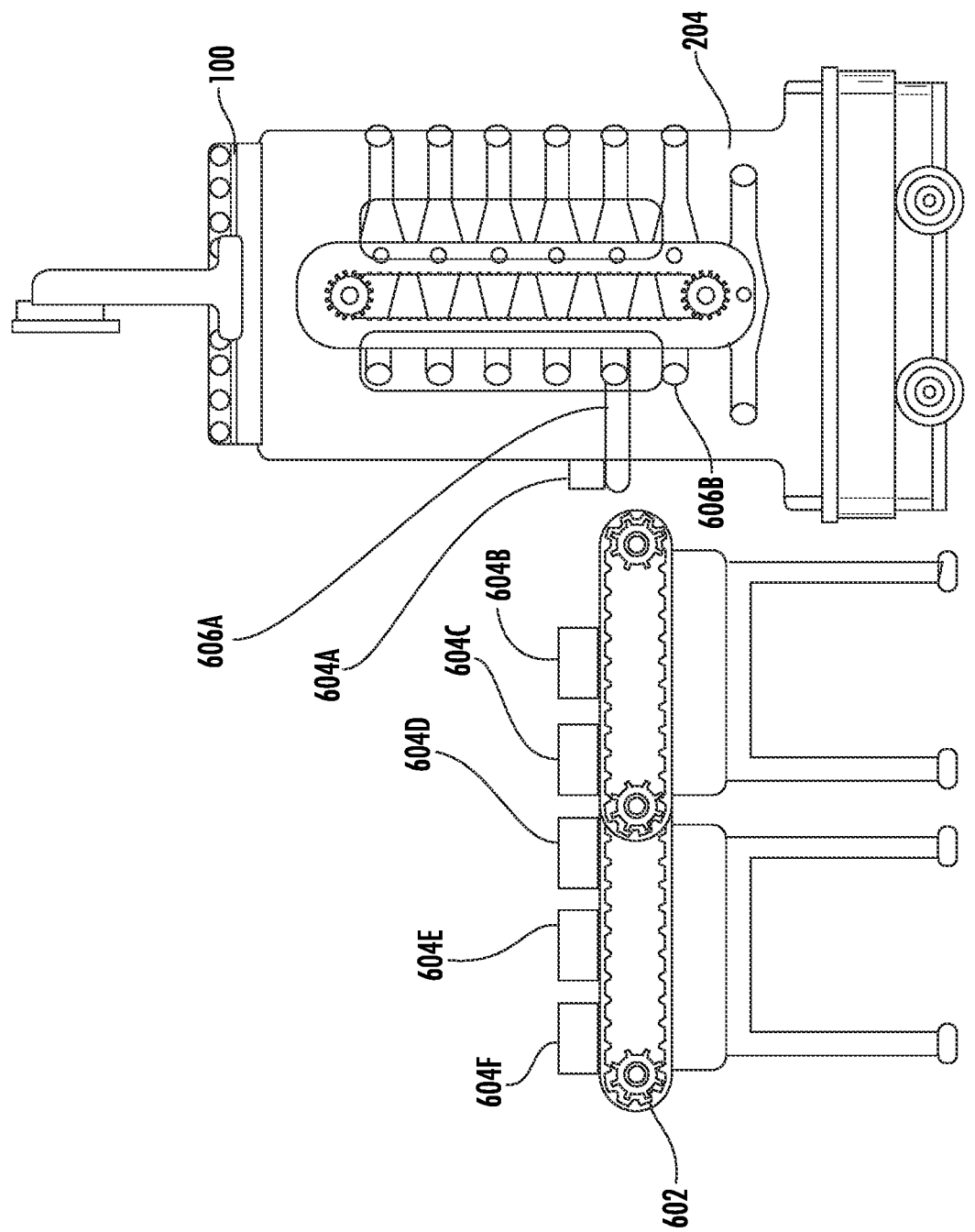
Figure 6B:
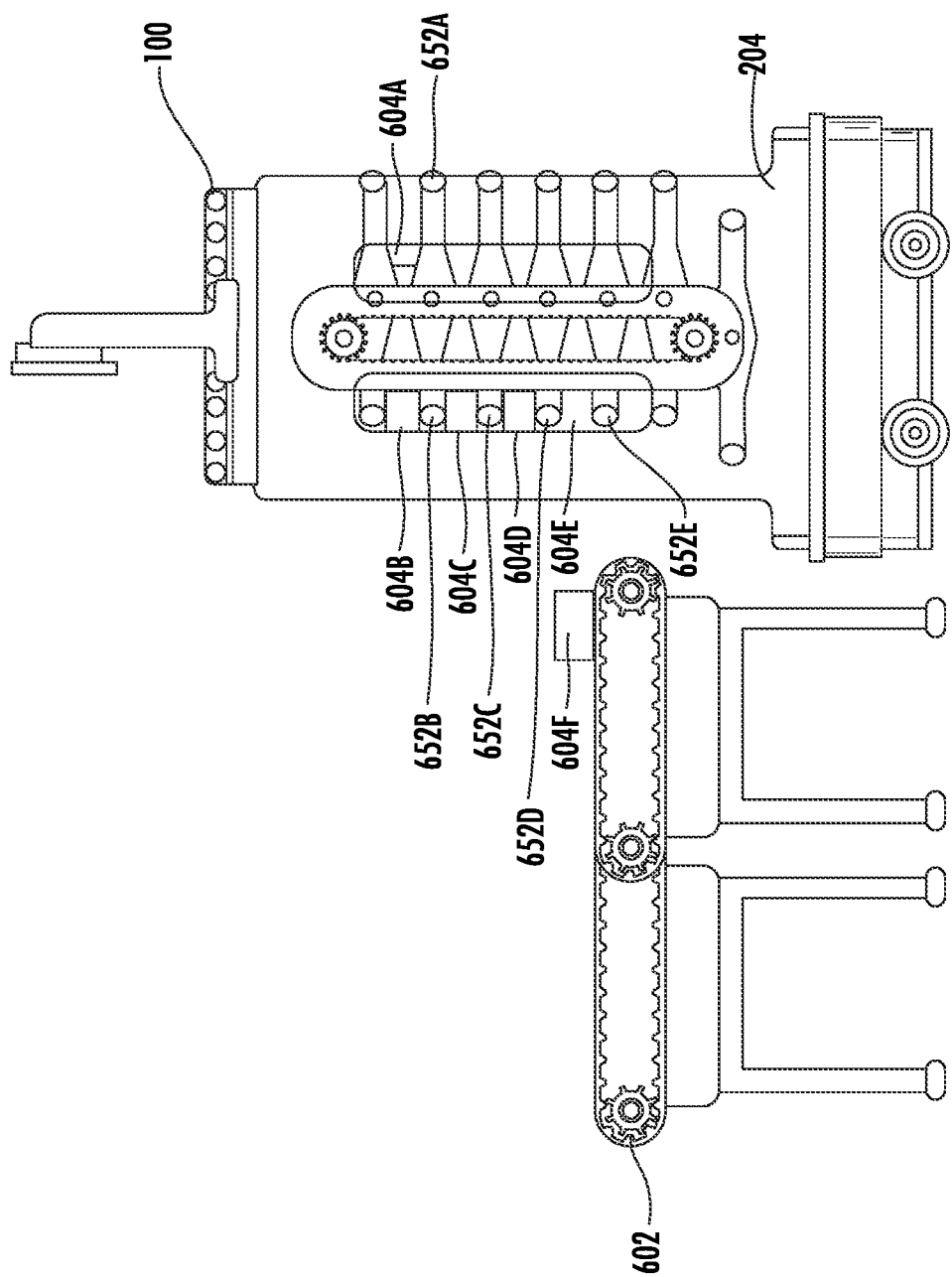
Figure 7:
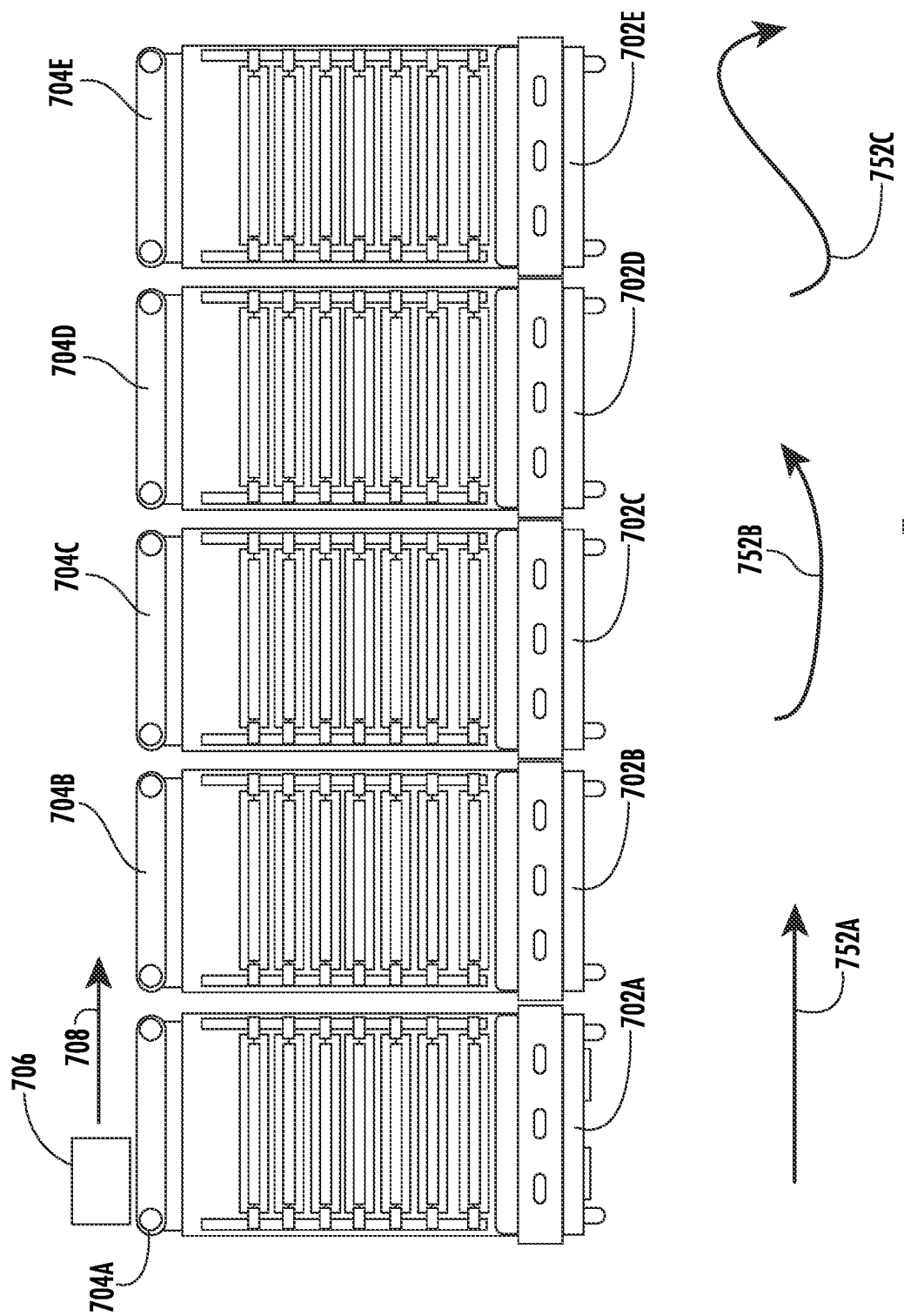
Figure 8:
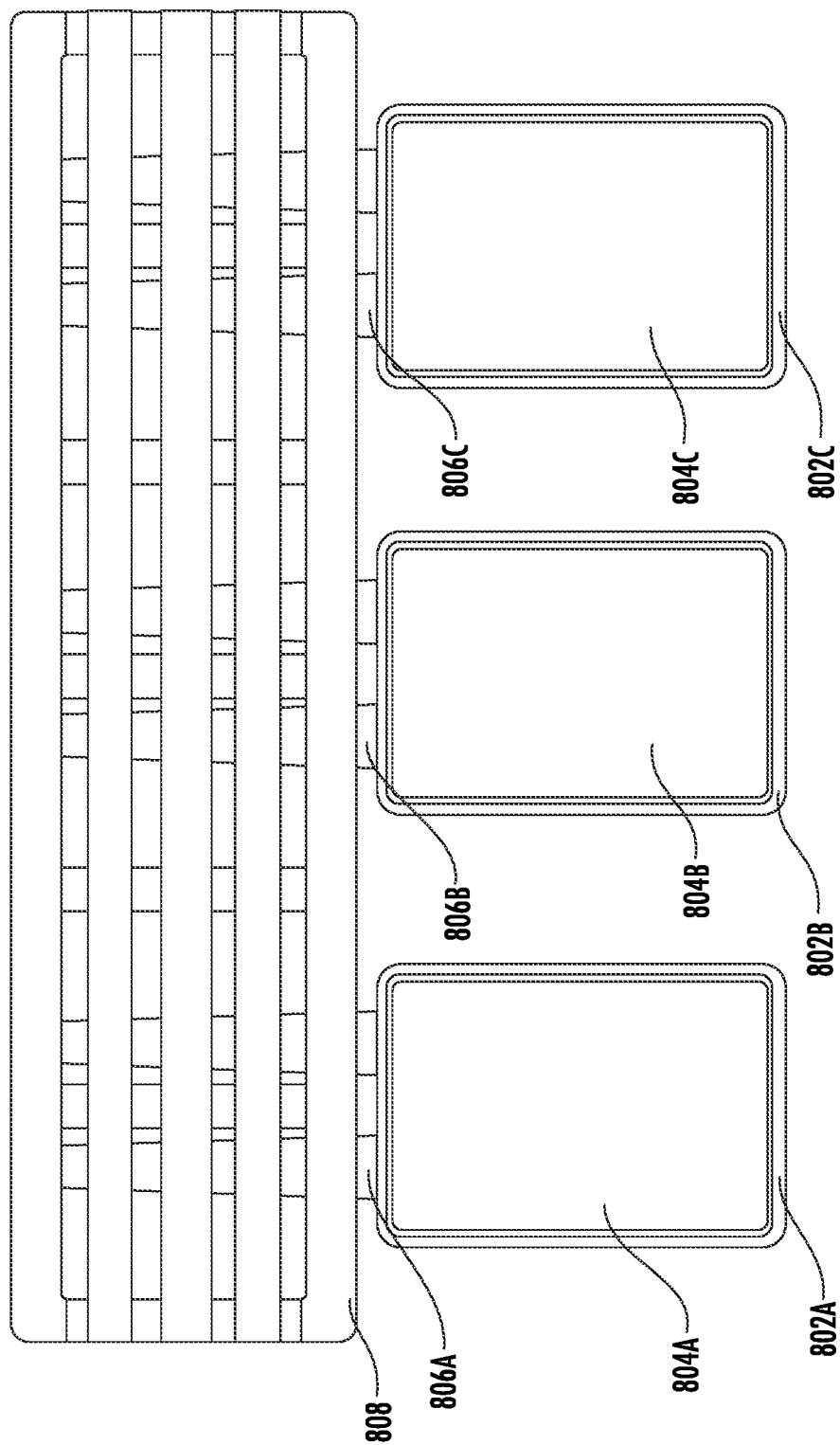
Figure 10A:
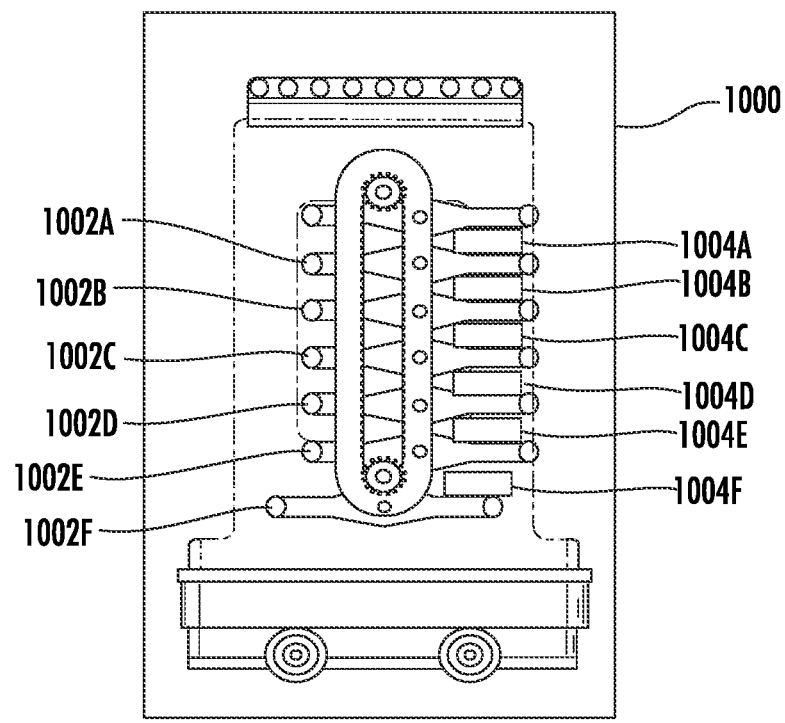
Figure 10B:
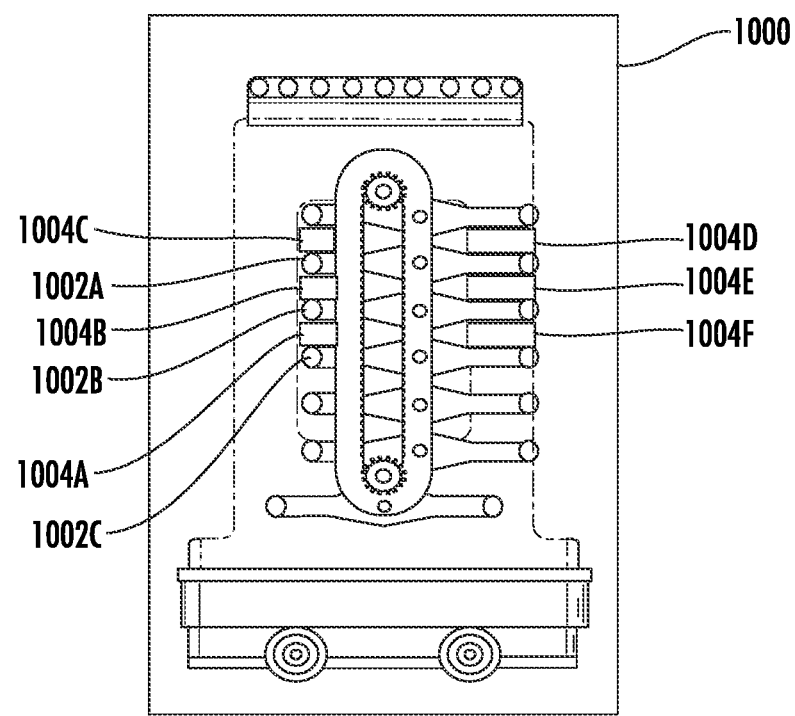
Figure 11:
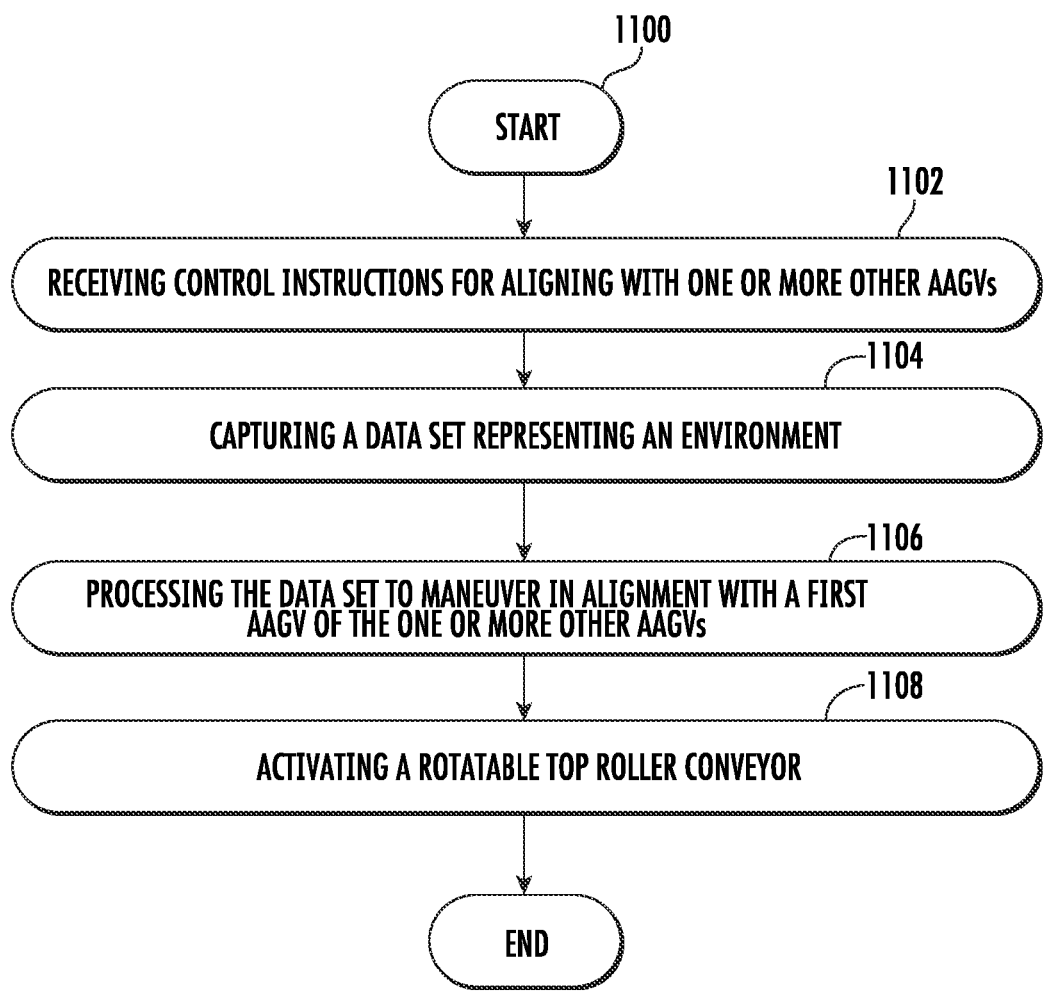

Having thus described the embodiments of the disclosure in general terms, reference now will be made to the accompanying drawings, which are not necessarily drawn to scale, and wherein:

FIG. 1A illustrates a side view of an adaptive autonomous guided vehicle in accordance with at least some example embodiments of the present disclosure;

FIG. 1B illustrates a front view of an adaptive autonomous guided vehicle in accordance with at least some example embodiments of the present disclosure;

FIG. 1C illustrates a front-right rotated view of an adaptive autonomous guided vehicle in accordance with at least some example embodiments of the present disclosure;

FIG. 1D illustrates a front-left rotated view of an adaptive autonomous guided vehicle in accordance with at least some example embodiments of the present disclosure;

FIG. 2 illustrates a side exploded view of subsystems of an adaptive autonomous guided vehicle in accordance with at least some example embodiments of the present disclosure;

FIG. 3 illustrates a block diagram of an example apparatus adaptive autonomous guided vehicle in accordance with at least some example embodiments of the present disclosure;

FIG. 4A illustrates a side view of an example vertical carousel and operation thereof in accordance with at least some example embodiments of the present disclosure;

FIG. 4B illustrates an example construction of an example vertical carousel and operation thereof in accordance with at least some example embodiments of the present disclosure;

FIG. 4C illustrates another example construction of an example vertical carousel and operation thereof in accordance with at least some example embodiments of the present disclosure;

FIG. 5 illustrates a base vehicle with retractable forklift arms in accordance with at least some example embodiments of the present disclosure;

FIGS. 6A and 6B each illustrate an onboarding process performed by an adaptive autonomous guided vehicle in accordance with at least some example embodiments of the present disclosure;

FIG. 7 illustrates alignment of a plurality of adaptive autonomous guided vehicles interacting for item relocating using a rotatable top conveyor in accordance with at least some example embodiments of the present disclosure;

FIG. 8 illustrates alignment of a plurality of adaptive autonomous guided vehicles interacting for item relocating using forklift arms in accordance with at least some example embodiments of the present disclosure;

FIGS. 9A, 9B, 9C, and 9D each illustrate a view of a rotatable top conveyor in accordance with at least some example embodiments of the present disclosure;

FIGS. 10A and 10B each illustrate a view of an adaptive autonomous guided vehicle during auto-balancing of an adaptive autonomous guided vehicle to a balanced center of gravity based at least in part on a current load distribution applied to the vertical carousel in accordance with at least some example embodiments of the present disclosure; and FIG. 11 illustrates a flowchart including operations for serial alignment of a plurality of adaptive autonomous guided vehicles in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, autonomous robot interact within an environment to perform particular tasks. Within a warehouse environment, for example, autonomous robots may be specially configured for item onboarding, transporting, sorting, offloading, and/or the like. Often, a first type of autonomous robot operates within the environment that performs item onboarding and transportation, a second type of autonomous robot that performs item sorting, a third type of autonomous robot that picks items from within the environment, a fourth type of autonomous robot that lifts and/or transports pallets, and the like. Such autonomous robots may need to interact with one another to accomplish a particular task or set of tasks, since each autonomous robot is often capable of only one particular type of operation. Additionally, in circumstances where multiple tasks must be performed in a particular area, such autonomous robots may block one another and/or perform inefficiently since only one of the robots may be at a particular location at a time without physically colliding with one another. In this regard, the use of such specialized autonomous robots for individual specialized tasks may suffer from particular deficiencies, such as limited throughput, unadaptable implementations, requires independent maintenance of multiple distinct and specialized units, and difficulties in interacting with certain environment layouts.

Embodiments of the present disclosure provide adaptive autonomous guided vehicles that are capable of performing a myriad of task operations. Such adaptive autonomous guided vehicles are modular and/or configurable to enable construction fitting a particular environment and/or task operation. In some embodiments, an adaptive autonomous guided vehicle includes at least a base vehicle that may support a vertical carousel including any number of carousel conveyor shelves. The vertical carousel may support a rotatable top conveyor and/or display. Additionally or alternatively, in some embodiments, an adaptive autonomous guided vehicle is instruction-driven to perform operations in cooperation with other adaptive autonomous guided vehicles of the same design. In this regard, embodiments of the present disclosure utilize any of such mechanisms, alone or in conjunction with one or more other adaptive autonomous guided vehicles to perform any number of different task operation(s).

Embodiments of the present disclosure are capable of performing any number of task operation(s), including various forms of item onboarding, sorting, picking, transportation, and offloading utilizing one or more mechanisms. In this regard, a single adaptive autonomous guided vehicle in accordance with the present disclosure may replace various individual, specialized autonomous robots that otherwise would be required to perform each of the individual task operation(s). Additionally, multiple adaptive autonomous guided vehicles controlled in conjunction with one another may perform task operation(s) that otherwise are not performable by individual adaptive autonomous guided vehicle(s) and/or by individual specialized autonomous robot(s). Additionally, utilizing particular elements such as a vertical carousel as described herein, embodiments of the present disclosure are capable of interacting with multiple items at once, while similarly remaining flexibly configurable for interacting with different types of items and/or to enable particular interactions with other adaptive autonomous guided vehicles and/or users. Additionally or alternatively still, some embodiments perform auto-balancing and/or other pre-processing operations to prevent errors in operation and/or interaction with items in the environment (e.g., dropped items, vehicle tipping over, and/or the like).

Definitions

The term "environment" refers to a physically defined area within which autonomous vehicles, human actors, and/or other entities interact with one or more object(s), machinery, and/or other features static or movable within the defined area.

The term "map" refers to electronically managed data representing an environment. In some embodiments, the map indicates traversable paths along which moving objects in the environment may traverse.

The term "real-time sensor" refers to one or more computing devices embodied in hardware, software, firmware, and/or a combination thereof, that captures electronically managed data representing at least one aspect of a monitored portion of an environment. Non-limiting examples of an environment sensor include a pressure sensor, a temperature sensor, a video camera, an image camera, a motion sensor, a LiDAR sensor, and/or a radio frequency sensor.

The term "real-time sensor data" refers to electronically managed data captured by an environment sensor and that represents at least one aspect of a monitored environment. Non-limiting examples of real-time sensor data includes image data, video data, motion data, LiDAR data, point cloud data, range data, pressure data, temperature data, and any information derived therefrom.

The terms "adaptive autonomous guided vehicle" and "AAGV" refers to one or more computing device(s) embodied in hardware, software, firmware, and/or any combination thereof, that is controlled at least in part by instructions generated by the one or more computing devices or received by the one or more computing device(s) from one or more external computing devices. An adaptive autonomous guided vehicle includes a plurality of subsystems that enable performance of a plurality of task operations, or is modular or constructable to affix and/or remove one or more subsystems that enable performance of the plurality of task operations.

The term "base vehicle" refers to one or more specially configured components that enable traversal throughout an environment. In some embodiments, a base vehicle is designed to receive one or more additional components that are mountable or otherwise affixable to the base vehicle.

The term "forklift arm" refers to any physical structure that is affixed to an adaptive autonomous guided vehicle for use in lifting an object.

The term "retractable forklift arm" refers to a forklift arm affixed to a portion of an adaptive autonomous guided vehicle that is extendable for operation from a resting position within a housing of the retractable forklift arm, and retractable into the housing.

The term "vertical carousel" refers to a mechanism within a housing, chassis, or apparatus that includes one or more horizontal surfaces at one or more vertical positions, where upon activation the mechanism rotates around an axis to reposition the one or more horizontal surfaces along a continuous path defined by the mechanism.

The term "carousel conveyor shelf" refers to horizontal surface of a vertical carousel embodied by a conveyor belt configured for horizontal conveyor rotation in one or more directions upon activation. A carousel conveyor shelf is fixedly attached to a vertical carousel for vertical movement around an axis of the vertical carousel.

The term "extendable slide" refers to a portion of a carousel conveyor shelf that is horizontally extendable and retractable.

The term "rotatable top conveyor" refers to a conveyor belt that is affixable to the top of a vertical carousel.

The term "affixable" refers to the ability to temporarily or permanently secure a component utilizing the design of the component itself or any external securing mechanisms, including without limitation one or more screws, fasteners, and/or rivets.

The term "processing circuitry" refers to hardware, software, firmware, and/or a combination thereof, that is specially configured to execute one or more particular process(es). In some embodiments, processing circuitry includes a memory that stores computer-coded instructions defining the one or more particular process(es) for execution.

The term "communicatively coupled" refers to connectivity between circuitry embodied in hardware, software, firmware, and/or a combination thereof that enables data communication between the circuitry.

The term "control" when used with respect to a particular device refers to initiation of one or more action(s) via the device. Non-limiting examples of ways in which a device may be controlled include for movement, specially-defined process(es), activation of a mechanism, and interaction with an environment.

The term "control instructions" refers to electronically managed data processable by one or more computing device(s) embodied in hardware, software, firmware, and/or a combination thereof, that control the one or more computing device(s) upon execution.

The term "target position" refers to a particular defined coordinate or defined area in an environment to which a moveable object is to be relocated.

The term "target rotation" refers to a particular angle or direction defined around a rotation access to which a particular device or component is to be rotated.

The terms "align" and "alignment" refers to an arrangement of multiple vehicles for use in performing a particular process utilizing the multiple vehicles.

The term "side-by-side alignment" refers to alignment of at least a first vehicle and a second vehicle, such that the first vehicle is positioned perpendicular to a forward direction of the second vehicle.

The term "forward-facing alignment" refers to alignment of at least a first vehicle and a second vehicle, such that the first vehicle is positioned in parallel to a forward direction of the second vehicle.

The term "current load distribution" refers to a sensor-driven or data-driven determination of a force currently affecting a vertical carousel based at least in part on one or more object(s) currently supported by one or more carousel conveyor shelf(s) of the vertical carousel.

The term "balanced center of gravity" refers to a data-driven determination for adjusting a vertical carousel to alter the current load distribution supported by the vertical carousel to be located at or as close as possible to an ideal center of gravity.

The term "display monitor" refers to one or more computing device(s) embodied in hardware, software, firmware, and/or a combination thereof that visually depicts data.

The term "impedes" refers to a data-driven and/or sensor-driven determination that an unidentified, foreign, or otherwise unexpected object is located in a defined space.

The term "unobstructed space" refers to a data-driven and/or sensor-driven determination that a defined space is sufficiently open to enable an object of a determinable size to pass through the defined space.

The term "onboarding" refers to a process for loading one or more object(s) onto an adaptive automated guided vehicle, where the one or more object(s) were previously positioned off of the adaptive automated guided vehicle.

The term "offloading" refers to a process for distributing one or more object(s) that are positioned on the adaptive automated guided vehicle.

The term "reconfiguration system" refers to one or more computing device(s), machine(s), and/or other mechanism(s) that are configured to automatically construct an adaptive automated guided vehicle and/or deconstruct an adaptive automated guided vehicle. In some embodiments, the reconfiguration system includes one or more mechanical arm(s), assembly line(s), and/or conveyor belt(s) that work in conjunction to assemble components of an adaptive automated guided vehicle in a particular order, and/or disassemble components of an adaptive automated guided vehicle in a particular order.

The term "reconfiguration location" refers to a particular coordinate and/or area in an environment where a reconfiguration system can interact with an adaptive automated guided vehicle. In some contexts, an adaptive automated guided vehicle traverses to the reconfiguration location to enable the reconfiguration system to modify, deconstruct and reconstruct, and/or otherwise interact with the adaptive automated guided vehicle.

Example Embodiments of AAGV

FIGS. 1A, 1B, 1C, and 1D illustrate various views of an example adaptive autonomous guided vehicle in accordance with at least some example embodiments of the present disclosure. In this regard, FIG. 1A illustrates a side view of an example adaptive autonomous guided vehicle, FIG. 1B illustrates a front view of an example adaptive autonomous guided vehicle, FIG. 1C illustrates a front-right rotated view of an example adaptive autonomous guided vehicle, and FIG. 1D illustrates a front-left rotated view of an example adaptive autonomous guided vehicle. Specifically, FIG. 1 illustrates an example adaptive autonomous guided vehicle 100 ("AAGV 100") in accordance with the present disclosure. It will be appreciated that in other embodiments one or more of the described components may be optionally included, removed from the AAGV, and/or the like.

The AAGV 100 includes a base vehicle 102. The base vehicle 102 enables the AAGV 100 to maneuver throughout an environment, for example based at least in part on one or more mechanisms that provide mobility. As illustrated, for example, the base vehicle includes tires 106 that may be connected to one or more motors, batteries, and/or other mechanisms (not depicted) that cause the tires to rotate. Such mechanisms may be internal to the base vehicle 102 and/or underlying the base vehicle 102. It will be appreciated that the tires 106 may be constructed of any one or more material(s) suitable for traversing throughout a particular environment. In other embodiments, alternative means are provided that come into contact with the environment to provide the ability to maneuver throughout the environment.

In some embodiments, the base vehicle 102 additionally or alternatively includes one or more real-time sensors that capture data representing one or more aspects of an environment. As illustrated, for example, the base vehicle 102 includes real-time sensors 104A, 104B, and 104C located in the front of the base vehicle 102. In some embodiments, the base vehicle 102 similarly includes one or more real-time sensors facing the back of the base vehicle 102 and/or facing one or both of the sides of the base vehicle 102. The captured data may represent any measurable and/or detectable aspect of the environment, which may be used for performing data-driven perception of the environment by the AAGV 100. Non-limiting examples of a real-time sensor include an image camera capturing real-time image data, a video camera capturing real-time video data, a motion sensor capturing real-time motion data, a RFID, near-field, or other close-range communication sensor capturing close-range data, a temperature sensor capturing real-time temperature data, a pressure sensor capturing real-time pressure data, a LiDAR sensor capturing real-time LiDAR data, and/or the like. In this regard, the real-time sensors may be utilized—alone or in conjunction with other real-time sensors of the AAGV 100—to capture data used for generating data representing a data-driven perception of the environment surrounding the AAGV 100. In one example context, the real-time sensors 104A, 104B, and 104C each embody a real-time video camera and/or LiDAR sensor outward facing from the base vehicle 102.

In other embodiments, an AAGV includes any number of additional and/or alternative real-time sensors. Such real-time sensors may be positioned in the base vehicle of the AAGV and/or in one or more other components and/or subsystems of the AAGV. For example, as depicted, the AAGV 100 includes side sensors 122A, 122B, 122C, and 122D located in the vertical carousel of the AAGV 100. Such side sensors 122A and 122B embody real-time sensors that capture data to a first side of the AAGV 100, and such side sensors 122C and 122D embody real-time sensors that capture data to a second side of the AAGV 100. In this regard, all real-time sensors may capture and transmit data for processing by the AAGV 100, for example by transmitting the captured real-time sensor data to processing circuitry of the base vehicle 102 for processing.

In some embodiments, the base vehicle 102 includes processing circuitry (not depicted) internal to the base vehicle 102 that performs various functionality. In some embodiments, the processing circuitry includes one or more processor(s), memory/memories, apparatus(es), and/or the like, that executes computer-coded instructions for performing the various functionality described herein. In some embodiments, the processing circuitry is configured to control some or all subsystems of the AAGV (e.g., a base system, a vertical carousel, a rotatable top conveyor, a display, and/or the like), cause movement of the AAGV 100, activate real-time sensors to capture real-time sensor data, process sensor data to perform perception of the surrounding environment and/or any of a myriad of determination(s) based on such perception, and/or the like. In other embodiments, various separate portions of processing circuitry control different subsystems of the AAGV 100.

The AAGV 100 further includes a vertical carousel. The vertical carousel is affixable to the base vehicle 102. In this regard, the vertical carousel may be a modular unit that is freely attachable to the base vehicle 102 and/or removable from the base vehicle 102. As illustrated, the vertical carousel is affixed to the top of the base vehicle 102. It will be appreciated that the vertical carousel may be affixed to the top of the base vehicle 102 by engaging predefined slots within the base vehicle 102 that receive at least a portion of the vertical carousel. Alternatively or additionally, in some embodiments, the vertical carousel may be affixed to the top of the base vehicle 102 utilizing one or more screw(s), bolt(s), rivet(s), and/or other securing mechanisms.

The illustrated vertical carousel includes a housing 112. The housing 112 defines a space within which all components of the vertical carousel may be housed for operation. For example, as illustrated, the housing 112 includes a belt 110 with which any number of carousel conveyor shelf(s) may be affixed. The housing may 112 may further include at least a portion of processing circuitry that control activation and/or operation of the vertical carousel. Additionally or alternatively, in some embodiments, the housing 112 engages one or more of the other subsystems. For example, in some embodiments, the housing 112 engages the top of the base vehicle 102 to affix the vertical carousel to the base vehicle 102. It will be appreciated that the housing 112 may be composed of any of a myriad of materials, for example plastic, glass, metal, and/or the like.

As illustrated, the vertical carousel includes a belt 110 that engages and/or otherwise interact with a motor that rotates the belt 110 around a particular axis. In some embodiments, the motor (not depicted) drives a gear that engages the belt 110 to cause the belt 110 to rotate around an axis in a clockwise or counter-clockwise motion. The belt 110 is fixedly attached to one or more carousel conveyor shelves. For example, the belt 110 may include screw(s), bolt(s), and/or other securing mechanism(s) that each secure a carousel conveyor shelf to the belt 110 in a horizontal position. As the belt 110 rotates around the axis, the change in the rotation of the belt 110 affects the location of each of a plurality of carousel conveyor shelves, such as the carousel conveyor shelves 108A-108G.

The AAGV 100 further includes a rotatable top conveyor. The rotatable top conveyor is affixable to the vertical carousel of the AAGV 100. In this regard, the rotatable top conveyor may be a modular unit that is freely attachable to the vertical carousel and/or removable from the vertical carousel. As illustrated, the rotatable top conveyor is affixed to the top of the vertical carousel by engaging predefined slots of the vertical carousel that receives at least a portion of the rotatable top conveyor. Alternatively or additionally, in some embodiments, the rotatable top conveyor is affixed to the top of the vertical conveyor utilizing one or more screw(s), bolt(s), rivet(s), and/or other securing mechanisms.

The illustrated AAGV 100 includes a rotatable top conveyor 116. The rotatable top conveyor 116 includes a conveyor belt that may be activated to begin rotation in a first direction or a second direction (e.g., clockwise or counter-clockwise). It will be appreciated that the rotatable top conveyor 116 may be activated separately from each of the carousel conveyor shelves 108A-108G. In this regard, the rotatable top conveyor 116 may be activated to one or more speeds to cause movement of item(s) placed on the rotatable top conveyor 116.

In some embodiments, the rotatable top conveyor 116 is rotatable around a particular axis. For example, in some embodiments the rotatable top conveyor 116 is rotatable around an axis along the height of the AAGV 100. In this regard, in some embodiments, the rotatable top conveyor 116 may be rotated to any of a myriad of predefined rotation(s) (e.g., set angles). For example, in some embodiments the rotatable top conveyor 116 may be rotated in 90-degree increments in either direction (e.g., clockwise or counterclockwise) to face each side of the AAGV 100. Additionally or alternatively, in some embodiments, the rotatable top conveyor 116 is rotatable freely to any angle 360 degrees around a rotation axis. In some embodiments, the rotatable top conveyor 116 rotates independently from the remaining subsystems of the AAGV 100. Alternatively or additionally, in some embodiments, the rotatable top conveyor 116 rotates together with the vertical carousel of the AAGV 100.

The illustrated AAGV 100 includes a display 120 affixable to the rotatable top conveyor 116. In some embodiments, the display 120 is affixable to the rotatable top conveyor 116 utilizing a display stand 118. The display stand 118 may be fixedly secured to each side of the rotatable top conveyor 116. For example, the display stand 118 may engage predefined slots of the rotatable top conveyor 116 and/or be secured utilizing screw(s), rivet(s), bolt(s), and/or other securing mechanisms. In some embodiments, the display stand 118 supports and/or houses one or more wire(s) and/or connection(s) to the display 120. In other embodiments, the display 120 is communicable via a wireless network for receiving and/or outputting data.

The display 120 may embody one or more computing device(s) that enable video and/or audio output. In some embodiments, the display 120 embodies or includes an electronic monitor and/or screen that enables rendering of visual information. In this regard, the display 120 may receive (via wired and/or wireless transmissions) data embodying and/or processable to display one or more graphical user interface(s). Additionally or alternatively, in some embodiments, the display 120 embodies or includes one or more speaker(s), audio output(s), and/or the like that output audio data. For example, in some embodiments the display 120 receives (via wired and/or wireless transmissions) data embodying and/or processable to generate particular audio output, such as sound(s), audio notification(s), and/or the like.

FIG. 2 illustrates a side exploded view of subsystems of an adaptive autonomous guided vehicle in accordance with at least some example embodiments of the present disclosure. Specifically, FIG. 2 illustrates an exploded view of the subsystems of the AAGV 100. The exploded view includes the base vehicle 202, the vertical carousel 204, the rotatable top conveyor 206, and the display 208. Each of the subsystems may be modularly removed from and/or included on the AAGV 100, for example during construction and/or reconstruction of the AAGV 100. For example, in some embodiments a reconstruction system is specially configured to construct the AAGV 100 via each of the subsystem depicted and described. In some embodiments, the base vehicle 202 may traverse and/or otherwise move to a reconstruction location where the reconstruction system may be interact with the base vehicle to construct and/or deconstruct the AAGV 100. The reconstruction system may first affix the vertical carousel 204 to the base vehicle 202, then affix the rotatable top conveyor 206 to the vertical carousel 204, and subsequently affix the display 208 to the rotatable top conveyor 206. The reconstruction system may include any of a myriad of specialized hardware and/or machines (e.g., robot arms, conveyor belts, and/or the like) to position each of the subsystems at the appropriate positions on the other subsystems. Alternatively or additionally, in some embodiments, a user may manually construct and/or deconstruct the AAGV 100 one subsystem at a time.

In some embodiments, each AAGV 100 processes data independently to identify task operation(s) and/or progress task operation(s) within a particular environment. In some embodiments, the AAGV 100 communicates with a central system that instructs and/or otherwise causes operation of the AAGV 100 and/or one or more other AAGVs. In some embodiments, the AAGV 100 receives control instructions embodying a task operation assigned to the AAGV 100 for performing. In some embodiments, a task operation includes or otherwise is associated with a target location where the AAGV 100 is to maneuver to perform the task operation. Additionally or alternatively, in some embodiments, the AAGV 100 communicates with a central system to receive the target location where the AAGV 100 is to traverse. Alternatively or additionally still, in some embodiments, the AAGV 100 communicates with a central system to receive a target item the AAGV 100 is to interact with, a target operation to be performed associated with a target item, and/or the like (e.g., instructions to onboard an item at a particular target location and transport the item to a second target location). In some embodiments, the central system provides such control instructions for any number of AAGVs within a particular environment, for example such that the central system orchestrates performance of any number of task operation(s) by such AAGVs individually or in cooperation with one another. Additionally or alternatively, in some embodiments, the AAGV 100 receives a task operation or similar goal operation to be performed by the AAGV 100, and utilizes one or more onboard real-time sensor(s) to generate particular control instructions that operate the AAGV 100 in a manner that interacts with and/or avoids collision with one or more other AAGVs in the environment while progressing towards completion of the assigned task operation.

It will be appreciated that one or more AAGVs may be assigned the same task operation (e.g., transporting a plurality of item(s)) and/or may be assigned entirely distinct task operations for performing within a particular environment. Regardless of the task operation, a plurality of AAGVs may interact with one another in circumstances where the AAGVs determine (e.g., from captured real-time sensor data) that such interaction enables completion of the task operation more efficiently, quicker, and/or with reduced error.

In some contexts, the AAGV 100 operates without one or more of the subsystems attached. For example, the AAGV 100 may optionally not include the display 208, for example such that the rotatable top conveyor 206 includes maximal space to allow objects to traverse along the conveyor. In another context, the AAGV 100 optionally does not include the rotatable top conveyor 206, for example such that the overall height of the AAGV 100 is further decreased. Additionally or alternatively, in some embodiments, the AAGV 100 optionally does not include the vertical carousel 204, for example such that the base vehicle 202 may interact with objects using the top of the base vehicle 202. In this regard, it will be appreciated that the AAGV 100 may be deconstructed to remove particular subsystems, and subsequently reconstructed to include other subsystems, as the AAGV 100 is utilized to perform particular tasks within a particular environment.

FIG. 3 illustrates a block diagram of an AAGV control apparatus, for example that generates control instructions for controlling an adaptive autonomous guided vehicle that may be specially configured in accordance with an example embodiment of the present disclosure. In some embodiments, the AAGV 100 includes one or more computing device(s) that control the subsystems of the AAGV 100, the computing device(s) embodied by hardware, software, firmware, and/or the like, such as the AAGV control apparatus 300 as depicted and described in FIG. 3. Alternatively or additionally, in some embodiments, the base vehicle 102 embodies or includes an AAGV control apparatus 300. In this regard, it will be appreciated that the AAGV control apparatus 300 may embody a processor and/or system communicatively coupled with the various components, subsystems, and/or other devices of an AAGV to generate and transmit control instructions that control and/or otherwise manipulate such components, subsystems, and/or other devices. The AAGV control apparatus 300 includes a processing circuitry 302, a memory 304, input/output circuitry 306, communications circuitry 308, and guided control circuitry 310. The AAGV control apparatus 300 may be configured, using one or more of the sets of circuitry 302, 304, 306, 308, and/or 310, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the AAGV control apparatus 300 may provide or supplement the functionality of another particular set of circuitry. For example, the processing circuitry 302 in some embodiments provides processing functionality to any of the sets of circuitry, the memory 304 provides storage functionality to any of the sets of circuitry, the communications circuitry 308 provides network interface functionality to any of the sets of circuitry, and/or the like.

In some embodiments, the processing circuitry 302 (and/or co-processor or any other processing circuitry assisting or otherwise associated with the processor) may be in communication with the memory 304 via a bus for passing information among components of the AAGV control apparatus 300. In some embodiments, for example, the memory 304 is non-transitory and may include, for example, one or more volatile and/or non-volatile memories. In other words, for example, the memory 304 in some embodiments includes or embodies an electronic storage device (e.g., a computer readable storage medium). In some embodiments, the memory 304 is configured to store information, data, content, applications, instructions, or the like, for enabling the AAGV control apparatus 300 to carry out various functions in accordance with example embodiments of the present disclosure.

The processing circuitry 302 may be embodied in a number of different ways. For example, in some example embodiments, the processing circuitry 302 includes one or more processing devices configured to perform independently. Additionally or alternatively, in some embodiments, the processing circuitry 302 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the AAGV control apparatus 300, and/or one or more remote or "cloud" processor(s) external to the AAGV control apparatus 300.

In an example embodiment, the processing circuitry 302 may be configured to execute instructions stored in the memory 304 or otherwise accessible to the processor. Alternatively or additionally, the processing circuitry 302 in some embodiments is configured to execute hard-coded functionality. As such, whether configured by hardware or software methods, or by a combination thereof, the processing circuitry 302 may represent an entity (e.g., physically embodied in circuitry) capable of performing operations according to an embodiment of the present disclosure while configured accordingly. Alternatively or additionally, as another example in some example embodiments, when the processing circuitry 302 is embodied as an executor of software instructions, the instructions may specifically configure the processing circuitry 302 to perform the algorithms embodied in the specific operations described herein when such instructions are executed.

As one particular example, the processing circuitry 302 may be configured to perform various operations associated with controlling an AAGV, for example as described with respect to operation of the AAGV 100 and/or particular subsystems thereof (e.g., the base vehicle 202, the vertical carousel 204, the rotatable top conveyor 206, and/or the display 208) and/or as described further herein. In some embodiments, the processing circuitry 302 includes hardware, software, firmware, and/or a combination thereof, that activates one or more real-time sensors. Additionally or alternatively, in some embodiments, the processing circuitry 302 includes hardware, software, firmware, and/or a combination thereof, that receives real-time sensor data from one or more real-time sensors. Additionally or alternatively, in some embodiments, the processing circuitry 302 includes hardware, software, firmware, and/or a combination thereof, that processes real-time sensor data for perceiving an environment. Additionally or alternatively, in some embodiments, the processing circuitry 302 includes hardware, software, firmware, and/or a combination thereof, that generates control instructions associated with one or more subsystems of an AAGV. Additionally or alternatively, in some embodiments, the processing circuitry 302 includes hardware, software, firmware, and/or a combination thereof, that transmits one or more control instructions to one or more subsystems of an AAGV to control the subsystem(s) by causing activation of one or more component(s) of the subsystem(s).

In some embodiments, the AAGV control apparatus 300 includes input/output circuitry 306 that may, in turn, be in communication with processing circuitry 302 to provide output to the user and, in some embodiments, to receive an indication of a user input. The input/output circuitry 306 may comprise one or more user interface(s) and may include a display that may comprise the interface(s) rendered as a web user interface, an application user interface, a user device, a backend system, or the like. In some embodiments, the input/output circuitry 306 may also include a keyboard, a mouse, a joystick, a touch screen, touch areas, soft keys a microphone, a speaker, or other input/output mechanisms. The processing circuitry 302 and/or input/output circuitry 306 comprising the processor may be configured to control one or more functions of one or more user interface elements through computer program instructions (e.g., software and/or firmware) stored on a memory accessible to the processor (e.g., memory 304, and/or the like). In some embodiments, the input/output circuitry 306 includes or utilizes a user-facing application to provide input/output functionality to a client device and/or other display associated with a user. In some embodiments, the input/output circuitry 306 is optionally excluded, for example in embodiments where the AAGV control apparatus 300 is entirely autonomous and no output to a user and/or input from a user is desired. In some embodiments, the input/output circuitry 306 includes or is embodied by a client device in communication with the AAGV control apparatus 300 that receives data for rendering via the client device.

The communications circuitry 308 may be any means such as a device or circuitry embodied in either hardware or a combination of hardware and software that is configured to receive and/or transmit data from/to a network and/or any other device, circuitry, or module in communication with the AAGV control apparatus 300. In this regard, the communications circuitry 308 may include, for example, a network interface for enabling communications with a wired or wireless communication network. For example, the communications circuitry 308 may include one or more network interface card(s), antenna(s), bus(es), switch(es), router(s), modem(s), and supporting hardware, firmware, and/or software, or any other device suitable for enabling communications via one or more communication network(s). Additionally or alternatively, the communications circuitry 308 may include circuitry for interacting with the antenna(s) and/or other hardware or software to cause transmission of signals via the antenna(s) or to handle receipt of signals received via the antenna(s). In some embodiments, the communications circuitry 308 enables transmission of data (e.g., to one or more server(s), other AAGVs, other components of the AAGV, and/or the like, associated with the AAGV control apparatus 300) and/or receipt of data (e.g., real-time, continuous sensor data from one or more real-time sensor(s) of the AAGV, one or more external real-time sensor(s), other AAGVs, and/or the like) in communication with the AAGV control apparatus 300.

The guided control circuitry 310 includes hardware, software, firmware, and/or a combination thereof, that supports various functionality associated with controlling and/or operation of an AAGV, such as the AAGV 100 as depicted and described herein. In some embodiments, the guided control circuitry 310 includes hardware, software, firmware, and/or a combination thereof, that captures and/or receives captured real-time sensor data from one or more real-time sensor(s). Additionally or alternatively, in some embodiments, the guided control circuitry 310 includes hardware, software, firmware, and/or a combination thereof, that processes captured real-time sensor data to perform perception of an environment based at least in part on the captured real-time sensor data. The guided control circuitry 310 may include one or more model(s) (e.g., machine learning model(s), artificial intelligence model(s), and/or the like) that accurately perform computer-vision and/or other perception determination(s) representing the environment. Additionally or alternatively, in some embodiments, the guided control circuitry 310 includes hardware, software, firmware, and/or a combination thereof, that generates control instruction(s). The control instruction(s) may be particular to operation of a particular subsystem of an AAGV based at least in part on the perception of the surrounding environment, a task operation assigned to the AAGV, a map of the environment within which the AAGV is operating, and/or the like. Additionally or alternatively, in some embodiments, the guided control circuitry 310 includes hardware, software, firmware, and/or a combination thereof, that transmits generated control instructions to particular components of one or more subsystems of an AAGV to control operation of such subsystems in accordance with the control instruction(s).

In some embodiments, for example, the guided control circuitry 310 includes hardware, software, firmware, and/or a combination thereof, that generates control instructions that control a base vehicle for movement to a particular target location. In some embodiments, for example, the guided control circuitry 310 includes hardware, software, firmware, and/or a combination thereof, that generates control instructions that control one or more subsystems for interacting with one or more other AAGVs. In one example context, the guided control circuitry 310 maintains map data representing traversable paths of an environment. The guided control circuitry 310 may capture real-time sensor data and process such real-time sensor data to make perception-based determinations for navigating throughout the environment without crashing. In some embodiments, the guided control circuitry 310 captures address data representing a position along a guide tape (e.g., a magnetic tape) throughout the environment, and determines a current location based at least in part on the address data and/or map data corresponding to the environment. Alternatively or additionally, in some embodiments, the guided control circuitry includes a safety system comprising emergency stop mechanism(s), collision detection sensor(s), drive contractors and brakes, and software for proactively controlling each of such component(s) to avoid environmental risks, collisions, and/or the like.

Additionally or alternatively, in some embodiments, the guided control circuitry 310 includes hardware, software, firmware, and/or a combination thereof, that generates control instructions that control a base vehicle to extends and/or retracts one or more retractable forklift arm(s). Additionally or alternatively, in some embodiments, the guided control circuitry 310 includes hardware, software, firmware, and/or a combination thereof, that generates control instructions that control a vertical carousel for auto-balancing. Additionally or alternatively, in some embodiments, the guided control circuitry 310 includes hardware, software, firmware, and/or a combination thereof, that generates control instructions for control a vertical carousel for rotating clockwise and/or counterclockwise. Additionally or alternatively, in some embodiments, the guided control circuitry 310 includes hardware, software, firmware, and/or a combination thereof, that generates control instructions that control a rotatable top conveyor for rotation clockwise and/or counterclockwise. Additionally or alternatively, in some embodiments, the guided control circuitry 310 includes hardware, software, firmware, and/or a combination thereof, that generates control instructions that control a rotatable top conveyor for rotation to begin spinning at a particular speed clockwise or counterclockwise. It will be appreciated that, in some embodiments, guided control circuitry 310 may include a separate processor, specially configured field programmable gate array (FPGA), or a specially programmed application specific integrated circuit (ASIC).

Additionally or alternatively, in some embodiments, one or more of the sets of circuitries 302-310 are combinable. Alternatively or additionally, in some embodiments, one or more of the sets of circuitry perform some or all of the functionality described associated with another component. For example, in some embodiments, one or more of the sets of circuitry 302-308 together with the guided control circuitry 310 are combined into a single module embodied in hardware, software, firmware, and/or a combination thereof. Similarly, in some embodiments, one or more of the sets of circuitry, for example the guided control circuitry 310, and the processing circuitry 302 are combined such that the processing circuitry 302 performs one or more of the operations described above with respect to each of these modules.

Example Operation and Use of AAGV Subsystems for Task Operations

Having described example AAGV implementations, subsystems, and apparatuses in accordance with the present disclosure, example operation and use of AAGV subsystems for performing task operations in accordance with the present disclosure will now be discussed. The operation of example subsystems of the AAGVs may enable any number of operations. In this regard, it will be appreciated that the particular mechanisms described herein for moving the subsystems of the AAGV are merely exemplary. In other embodiments, other mechanisms that perform substantially the similar functions may be utilized to effectuate movement of the individual subsystems and/or components thereof for a particular AAGV. Additionally, it will be appreciated that the example operations described herein performed by an AAGV are merely exemplary. In other contexts, an AAGV may utilize the same subsystems for performing any of a myriad of other task operations. In this regard, the particular mechanisms for controlling the AAGV subsystems and/or task operations performed thereby are provided as illustrative examples and not to limit the scope and/or spirit of the disclosure.

FIG. 4A illustrates a side view of an example vertical carousel and operation thereof in accordance with at least some example embodiments of the present disclosure. Specifically, FIG. 4A illustrates operation of an example vertical carousel 400. In some embodiments, the vertical carousel 400 embodies one implementation of the vertical carousel as depicted and described with respect to FIGS. 1A, 1B, 1C, and 1D.

The vertical carousel 400 includes a plurality of individual carousel conveyor shelves 408A-408G (collectively "carousel conveyor shelves 408"). In some embodiments, each carousel conveyor shelf of the carousel conveyor shelves 408 embodies a horizontal conveyor that enables rotation in one direction or in two directions (e.g., clockwise and/or counterclockwise). It will be appreciated that a vertical carousel may include any number of individual carousel conveyor shelves. In some embodiments, the individual carousel conveyor shelves may be separated by a minimum height threshold that enables item(s) of a particular height to traverse along a carousel conveyor shelf without making contact with a second carousel conveyor shelf above in the vertical carousel 400. For example, as depicted, the carousel conveyor shelf 408G stores a first item 412B that is positioned on top of the carousel conveyor shelf 408G. The height between the top of the carousel conveyor shelf 408G and the bottom of the carousel conveyor shelf 408F (located above the carousel conveyor shelf 408G) may be sufficient to account for at least the height of the item 412B, such that the item 412B may freely traverse along the length of the carousel conveyor shelf 408G.

Additionally, in some embodiments, one or more of the carousel conveyor shelves 408 (or each of the carousel conveyor shelves 408) includes an extendable slide. Each extendable slide may be controlled by one or more motor(s) associated with the corresponding carousel conveyor shelf. For example, as depicted, the carousel conveyor shelf 408B includes extendable slide 410. The extendable slide 410 is controlled by a motor associated with the carousel conveyor shelf 408B, for example the induction motor 414B. The induction motor 414B may drive the extendable slide 410 to extend the extendable slide 410 out in a direction parallel to the carousel conveyor shelf 408B, and/or retract the extendable slide 410 back to a resting position. In this regard, an extendable slide such as the extendable slide 410 may be extended to enable placement and/or onboarding of an item on the extendable slide 410, and once the item is detected and/or otherwise indicated as positioned on the extendable slide 410, the extendable slide 410 may be retracted to bring the item into the carousel conveyor shelf 408B during a resting position. In some embodiments, each carousel conveyor shelf includes an extendable slide (and/or associated motor) on each side of the carousel conveyor shelf. Such extendable slides may be controlled separately, such that one side may be extended, both sides may be extended simultaneously, and/or the like. It will be appreciated that each carousel conveyor shelf may include one or more extendable slide(s), each carousel conveyor shelf and/or extendable slide(s) thereof controlled separate from the other carousel conveyor shelves.

The vertical carousel 400 includes a ratchet belt 406. The ratchet belt 406 embodies a large internal belt that is fixedly connected to each of the carousel conveyor shelves 408. In this regard, a particular carousel conveyor shelf may be fixedly secured to the ratchet belt 406 via one or more screw(s), bolt(s), rivet(s), and/or the like, such that the particular carousel conveyor shelf remains in a horizontal or flat position as the ratchet belt 406 rotates. In this regard, the ratchet belt 406 is secured to each of the carousel conveyor shelves 408 such that the rotation of the ratchet belt 406 does not cause a shift in the angle of each of the carousel conveyor shelves 408 that would result in movement of an item on any one of the carousel conveyor shelves 408 due to a gravitational force.

The ratchet belt 406 engages a first motor-controlled gear 404A and a second motor-controlled gear 404B. The first motor-controlled gear 404A and the second motor-controlled gear 404B may each be connected to one or more motor(s) that drive rotation in one or more directions, for example clockwise and/or counter-clockwise as depicted by rotation direction 402. As the motor(s) are activated, the motor-controlled gears 404A and/or 404B are caused to rotate clockwise or counterclockwise, further engaging the ratchet belt 406 to similarly cause a clockwise or counterclockwise rotation of the ratchet belt 406. In this regard, the vertical and/or horizontal position of each of the carousel conveyor shelves 408 may change based on the rotation of the ratchet belt 406 as the first motor-controlled gear 404A and second motor-controlled gear 404B are driven. The first motor-controlled gear 404A and second motor-controlled gear 404B may be controlled by processing circuitry of the AAGV, and may be controlled by the same processing circuitry and/or different processing circuitry than that which controls each of the individual carousel conveyor shelves 408 and/or the induction motor(s) associated with the individual extendable slide(s) of the individual carousel conveyor shelves 408.

FIG. 4B illustrates an example construction of an example vertical carousel and operation thereof in accordance with at least some example embodiments of the present disclosure. Specifically, FIG. 4B depicts a construction of a vertical carousel 420 including a plurality of carousel conveyor shelves 422A-422G (collectively "carousel conveyor shelves 422") that are rotatable around the vertical carousel. The plurality of carousel conveyor shelves 422 are affixed to a flexible belt 428.

In some embodiments, the flexible belt 428 flexibly expands in one or more directions to enable the expansion of the flexible belt 428 in a manner that prevents collision of one or more of the carousel conveyor shelves 422 as they rotate. For example, the flexible belt 429 may be engaged by one or more motor(s), rail(s), and/or other mechanism(s) that apply a horizontal fore to the flexible belt 428 to expand the flexible belt as a carousel conveyor shelf is to be rotated from one side of the flexible belt 428 to the other side. Similarly, the motor(s), rail(s), and/or other mechanism(s) may cease applying the force and/or apply an opposite horizontal force to contract the flexible belt once the one or more carousel conveyor shelf/shelves are rotated to the other side of the flexible belt 428. It will be appreciated that in some embodiments the processing circuitry that controls the rotation of the carousel conveyor shelves 422 may similarly control the expansion and/or contraction of the flexible belt 428. In other embodiments, separate processing circuitry controls each of the rotation of the carousel conveyor shelves 422 and the expansion and/or contraction of the flexible belt 428 to allow for such rotation without collision. In yet some other embodiments, the flexible belt 428 is of sufficient width to allow for two columns of carousel conveyor shelves, such that the vertical carousel need not horizontally expand to avoid collision as the carousel conveyor shelves are rotated.

Each of the plurality of carousel conveyor shelves 422 are affixed to the flexible belt 428 at a fixed orientation using any of a myriad of securing mechanisms. Specifically, as illustrated, each carousel conveyor shelf of the carousel conveyor shelves 422 is fixedly secured to the flexible belt 428 via the securing mechanisms 424A-424G (collectively "securing mechanisms 424"). Each of the securing mechanisms 424 may be embodied by one or more screw(s), bolt(s), rivet(s), and/or the like that keep a corresponding carousel conveyor shelf in a fixed position and orientation with respect to the flexible belt 428 as the flexible belt 428 rotates. In this regard, each of the securing mechanisms 424 may rotate in a manner that keeps the corresponding carousel conveyor shelf level (e.g., horizontal) even as the flexible belt 428 continues to rotate. For example, as illustrated, the securing mechanism 424A secures the carousel conveyor shelf 422A, the securing mechanism 424B secures the carousel conveyor shelf 422B, and so on. It will be appreciated that in this regard, while any particular carousel conveyor shelf may slightly change orientation, it remains sufficiently horizontal to prevent sliding of one or more item(s) onboard the carousel conveyor shelf from sliding along the carousel conveyor shelf.

The vertical carousel 420 may rotate to enable some or all of the carousel conveyor shelves 422 to rotate from one side to the other side of the vertical carousel 420 during operation. For example, as depicted, the carousel conveyor shelves may rotate to the positions depicted by shelf positions 426. In some embodiments, the flexible belt 428 is expanded to enable the carousel conveyor shelves 422 to reach the other side of the vertical carousel 420 without colliding with other carousel conveyor shelf/shelves during such rotation. Additionally or alternatively, in some embodiments, the flexible belt 428 contracts upon determining the carousel conveyor shelves 422 reached the target position on the other side of the vertical carousel 420. It will be appreciated that while one or more of the carousel conveyor shelves 422 are horizontally aligned with one or more of the other carousel conveyor shelves, or in some embodiments are positioned facing the inside of the vertical carousel 420, such one or more carousel conveyor shelves may not be activatable to extend an extendable slide associated therewith. In some embodiments, the side of the carousel conveyor shelf that faces away from the vertical carousel 420 may remain activatable.

FIG. 4C illustrates another example construction of an example vertical carousel and operation thereof in accordance with at least some example embodiments of the present disclosure. Specifically, FIG. 4C depicts a construction of a vertical carousel 450 including a plurality of one-sided carousel conveyor shelves 452A-452G (collectively "carousel conveyor shelves 452"). As depicted, the carousel conveyor shelves 452 each are directed to the right, for example such that an extendable slide may be extended from one or more of the carousel conveyor shelves 452 to the right. The plurality of carousel conveyor shelves 452 are affixed to a belt 458.

In some embodiments, the belt 458 is of a width sufficient to enable the carousel conveyor shelves 452 to be positioned within the inner loop formed by the belt 458 while fixedly attached to one side of the vertical carousel 450. In some such embodiments, the belt 458 embodies a rigid belt, such that the carousel conveyor shelves 452 are positioned within the loop formed by the belt 458 while positioned on the left side of the vertical carousel 450 as depicted. Similarly, the carousel conveyor shelves 452 each are positioned facing outward from the vertical carousel 450 while positioned on the right side of the vertical carousel 450 as depicted. In some embodiments, the belt 458 embodies a flexible belt that expands and/or contracts as the carousel conveyor shelves 452 rotate around. For example, the belt 458 may expand as one or more of the carousel conveyor shelves 452 rotate between sides of the vertical carousel 450, for example along the top or the bottom of the belt 458 as depicted. It will be appreciated that, in some embodiments, the processing circuitry that controls the rotation of the carousel conveyor shelves 452 between positions may similarly control the expansion and/or contraction of the belt 458 in a circumstance where the belt 458 embodies a flexible belt. In other embodiments, separate processing circuitry controls each of the rotation of the carousel conveyor shelves 452 and the expansion and/or contraction of the belt 458 to allow for such rotation without collision.

Each of the plurality of carousel conveyor shelves 452 are affixed to the belt 458 at a fixed orientation using any of a myriad of securing mechanisms. Specifically, as illustrated, each carousel conveyor shelf of the carousel conveyor shelves 452 is fixedly secured to the belt 458 via the securing mechanisms 454A-454G (collectively "securing mechanisms 454"). Each of the securing mechanisms 454 may be embodied by one or more screw(s), bolt(s), rivet(s), and/or the like that keep a corresponding carousel conveyor shelf in a fixed position and orientation with respect to the belt 458 as the belt 458 rotates. In this regard, each of the securing mechanisms 454 may rotate in a manner that keeps the corresponding carousel conveyor shelf level (e.g., horizontal) even as the belt 458 continues to rotate. For example, as illustrated, the securing mechanism 454A secures the carousel conveyor shelf 452A, the securing mechanism 454B secures the carousel conveyor shelf 452B, and so on. It will be appreciated that in this regard, while any particular carousel conveyor shelf may slightly change orientation, the carousel conveyor shelf remains sufficiently horizontal to prevent sliding of one or more item(s) onboard the carousel conveyor shelf from sliding along and/or off of the carousel conveyor shelf.

The vertical carousel 450 may rotate to enable some or all of the carousel conveyor shelves 452 to rotate from one side of the vertical carousel 450 during operation. For example, as depicted, the carousel conveyor shelves 452 may rotate to the positions depicted by shelf positions 456. In some embodiments, the belt 458 is expanded to enable the carousel conveyor shelves 452 to reach the other side of the vertical carousel 450 without colliding with other carousel conveyor shelf/shelves during such rotation. Additionally or alternatively, in some embodiments, the belt 458 contracts upon determining the carousel conveyor shelves 452 reached target position(s) on the other side of the vertical carousel 450. It will be appreciated that while one or more of the carousel conveyor shelves 452 are horizontally aligned with one or more of the other carousel conveyor shelves, or in some embodiments while a carousel conveyor shelf is positioned facing the inside of the vertical carousel 450, such one or more carousel conveyor shelves may not be activatable (e.g., to extend an extendable slide associated therewith). In some such embodiments, only the carousel conveyor shelves 452 that are positioned facing outward from the vertical carousel 450 remain activatable.

It will be appreciated that, although the carousel conveyor shelves 452 are depicted facing right as illustrated, the carousel conveyor shelves 452 may be affixed to the belt 458 in any desired orientation. In some embodiments, for example, carousel conveyor shelves 452 are affixed to the belt 458 facing left. In such alternative constructions, the vertical carousel may nevertheless function similarly as described with respect to FIGS. 4A, 4B, and 4C.

FIG. 5 illustrates a base vehicle with retractable forklift arms in accordance with at least some example embodiments of the present disclosure. Specifically, FIG. 5 illustrates such operation of a base vehicle 102 of the AAGV 100 with one or more other subsystems removed (e.g., the vertical carousel 204, the rotatable top conveyor 206, and the display 208). In this regard, the base vehicle 102 may be deconstructed from the AAGV 100 manually or via a reconstruction system.

The base vehicle 102 includes retractable forklift arms 502. It will be appreciated that the retractable forklift arms 502 may be constructed of any of a myriad of materials. In some embodiments, the retractable forklift arms 502 are composed of steel, iron, or other metal(s). In some embodiments, the retractable forklift arms 502 are composed of a hard plastic or composite material. In some embodiments, the retractable forklift arms 502 are made of a material that best fits a particular task operation assigned to the base vehicle. For example, different base vehicles having retractable forklift arms of different material may be capable of supporting different maximum load threshold(s) without risking damage and/or destruction of the base vehicle and/or retractable forklift arms.

The retractable forklift arms may be controlled by processing circuitry of the base vehicle 102. In some embodiments, the processing circuitry is configured to extend and/or retract the retractable forklift arms 502 based at least in part on a task operation assigned to the AAGV. For example, in circumstances where the base vehicle 102 is assigned a task indicating an item representing a pallet is to be picked up and relocated, the base vehicle 102 may extend the retractable forklift arms 502. Upon detecting completion of the task operation, the base vehicle 102 may retract the retractable forklift arms 502 to a resting position.

In some embodiments, the retractable forklift arms 502 extend from a resting position attached to an undercarriage of the base vehicle 102. In this regard, the retractable forklift arms 502 may be accessible from the underside of the base vehicle 102. In some embodiments, the retractable forklift arms 502 extend from a resting position within the base vehicle 102. In some such embodiments, the base vehicle 102 may require deconstruction to access the retractable forklift arms 502 when in a rest position due to the chassis housing the retractable forklift arms 502 in the resting position.

FIGS. 6A and 6B each illustrate an onboarding process performed by an adaptive autonomous guided vehicle in accordance with at least some example embodiments of the present disclosure. Specifically, FIG. 6A depicts onboarding of a first item 604A via a vertical carousel 204 of an example AAGV 100 at a first time slice of an onboarding process. FIG. 6B depicts a second time slice during the onboarding process at which all but one item 604F has been onboarded via the vertical carousel 204 of the example AAGV 100. It will be appreciated that any number of items may be onboarded during a particular onboarding process in the manner described, for example up to a maximum item threshold that corresponds to a maximum number of items that may be supported via the vertical carousel 204 of the AAGV 100. In some embodiments, the maximum item threshold corresponds to the number of carousel conveyor shelves of the vertical carousel 204 multiplied by two, for example in circumstances where one item is storable to each side of the vertical carousel 204.

In some embodiments, the base vehicle 102 and/or and associated AAGV determines whether one or more spaces of an associated vertical carousel are impeded by item(s) engaged via the retractable forklift arms 502. For example, in some embodiments, the AAGV including base vehicle 102 further includes one or more real-time sensor(s) that detect a space that is taken up by the item(s) onboard the retractable forklift arms 502. In a circumstance where the height of the item(s) reaches one or more carousel conveyor shelves of a vertical carousel affixed to the base vehicle 102, the AAGV may determine that such space in front of such carousel conveyor shelf/shelves are impeded. In some such circumstances, the AAGV may generate control instructions for offloading one or more of the item(s) onboard the retractable forklift arms 502 before completing offloading of item(s) from the impeded carousel conveyor shelves. Alternatively or additionally, in some embodiments, the AAGV may generate control instructions for altering the position of the impeded carousel conveyor space to a higher position that remains unimpeded, such that an item may be offloaded regardless of the impeded space. Additionally or alternatively, in some embodiments, the AAGV may generate control instructions for repositioning the object to another side of the carousel conveyor shelf to enable offloading from the other side of the carousel conveyor shelf. It will be appreciated that the AAGV including the base vehicle 102 may perform any of a myriad of process(es) in response to detecting impeded space.

FIGS. 6A and 6B depict onboarding of items from an external item delivery conveyor 602. In some embodiments, the external item delivery conveyor 602 include or embody one or more conveyor belt(s) external to the AAGV 100 that receives and/or pick items for further transport via the AAGV 100. In some embodiments, the external item delivery conveyor 602 is controlled by a system separate from that which controls the AAGV 100. Alternatively or additionally, in some embodiments, a single system controls and/or coordinates the AAGV 100 and the external item delivery conveyor 602. In some such embodiments, the external system synchronizes the external item delivery conveyor 602 for efficiently onboarding items to the AAGV 100 and/or a fleet of AAGVs including the AAGV 100.

During onboarding via the vertical carousel 204, each item may be placed via a particular carousel conveyor shelf. For example, as illustrated in FIG. 6A, the first item 604A is onboarded onto the carousel conveyor shelf 606A. In some embodiments, the AAGV identifies and/or selects the carousel conveyor shelf 606A based at least in part on a determined height of the external item delivery conveyor 602 (e.g., via sensor data) and/or a predetermined or otherwise known height of the external item delivery conveyor 602. In other embodiments, the AAGV 100 configured to begin onboarding from a particular index or position of carousel conveyor shelf, for example corresponding to the carousel conveyor shelf 606A.

To complete onboarding of an item, such as the first item 604A, the conveyor carousel shelf may extend an extendable slide to receive the item from the external item delivery conveyor 602. For example, the carousel conveyor shelf 606A may extend a first extendable shelf to position the first extendable shelf proximate to (e.g., within a predetermined maximum distance threshold) and/or otherwise in line with the external item delivery conveyor 602. Upon activation of the external item delivery conveyor 602 (e.g., by an external system or via one or more signals transmitted via the AAGV 100), the external item delivery conveyor 602 may rotate in a particular direction towards the AAGV 100 to cause the first item 604B to traverse along and ultimately off of the external item delivery conveyor 602 to transition to the extendable slide of the carousel conveyor shelf 606A. Once the AAGV 100 determines and/or detects the first item 604A has been received and/or otherwise placed on the extendable slide of the carousel conveyor shelf 606A, the AAGV 100 may activate and/or retract the extendable slide to secure the first item 604A on the carousel conveyor shelf 606A.

Upon successfully onboarding the first item 604A to the carousel conveyor shelf 606A, the AAGV may activate the vertical carousel 204 to cause rotation of the carousel conveyor shelves to new positions. For example, the AAGV 100 may activate the vertical carousel 204 to rotate vertically in a particular direction (e.g., either clockwise or counterclockwise) to move a next empty carousel conveyor shelf at a particular position for onboarding another item (e.g., the second item 604B). In one example context, the AAGV 100 activates the vertical carousel 204 to rotate the vertical carousel 204 in a clockwise direction, moving the carousel conveyor shelf 606A up and positioning a new carousel conveyor shelf 606B in line with the external item delivery conveyor 602 for onboarding the next item 604B.

In this regard, this process may repeat for onboarding any number of items onto the AAGV 100. As illustrated for example, this process may be repeated to onboard each of the first item 604A, second item 604B, third item 604C, fourth item 604D, and fifth item 604E between the first time slice depicted in FIG. 6B and the second time slice depicted in FIG. 6B. As illustrated in FIG. 6B, the carousel conveyor shelves are rotated to position each of the items 604A-604E at sequential carousel conveyor shelves of the vertical carousel 204. Specifically, as illustrated in FIG. 6B, the first item 602A is positioned on the carousel conveyor shelf 652A, rotated the most positions from the initial position used to onboard the items. Similarly, second item 602B is positioned on the carousel conveyor shelf 652B, third item 602C is positioned on the carousel conveyor shelf 652C, fourth item 602D is positioned on the carousel conveyor shelf 652D, and fifth item 602E is positioned on the carousel conveyor shelf 652E. In this regard, the AAGV 100 may rotate the vertical carousel 204 one more position to enable onboarding of the final item 604F (e.g., onto the carousel conveyor shelf under the carousel conveyor shelf 652E).

Upon completion of the onboarding process for the items 604A-604G, the AAGV 100 may initiate one or more process(es) for delivering the items 604A-604G to one or more particular target location(s). In this regard, the items 604A-604G may be stored via the vertical carousel 204 during such transportation and/or until offboarding of the items 604A-604G is to be performed. In some embodiments for example, the AAGV 100 maneuvers to one or more location(s) in an environment such that the items 604A-604G may be offboarded to particular operator(s), automatic system(s), other AAGV(s), and/or the like. It will be appreciated that to offload particular items, the AAGV 100 may rotate the vertical carousel 204 in the reverse direction utilized for onboarding, and/or in some embodiments may offboard from a different position such that one or more rotations in the reverse direction is not necessary for offboarding.

In some embodiments, an AAGV receives, stores, transports, and/or otherwise interact(s) with item(s) utilizing other subsystem(s) of the AAGV. In some embodiments, for example, an AAGV receives and/or interacts with item(s) via a rotatable top conveyor. FIGS. 9A, 9B, 9C, and 9D each illustrate a view of a rotatable top conveyor in accordance with at least some example embodiments of the present disclosure. Specifically, each illustrates a rotatable top conveyor orientated in accordance with a different angle of rotation for use in offboarding items based at least in part on the particular angle of rotation.

For example, in one example context as depicted in FIG. 9A, an AAGV receives a plurality of items 904A-904D via the rotatable top conveyor 902. The rotatable top conveyor 902 is orientated in accordance with a first rotation angle such that the conveyor is activated to traverse the items in a first direction represented by the first direction 906A. The AAGV and/or associated processing circuitry thereof may activate the rotatable top conveyor 902 to cause the rotatable top conveyor 902 to begin spinning, thereby causing the items 904A-904D to traverse in the first direction 906A. The item 904A may be expelled and/or otherwise launched via the rotatable top conveyor 902, for example to another system, AAGV, and/or the like.

Figure 9B:
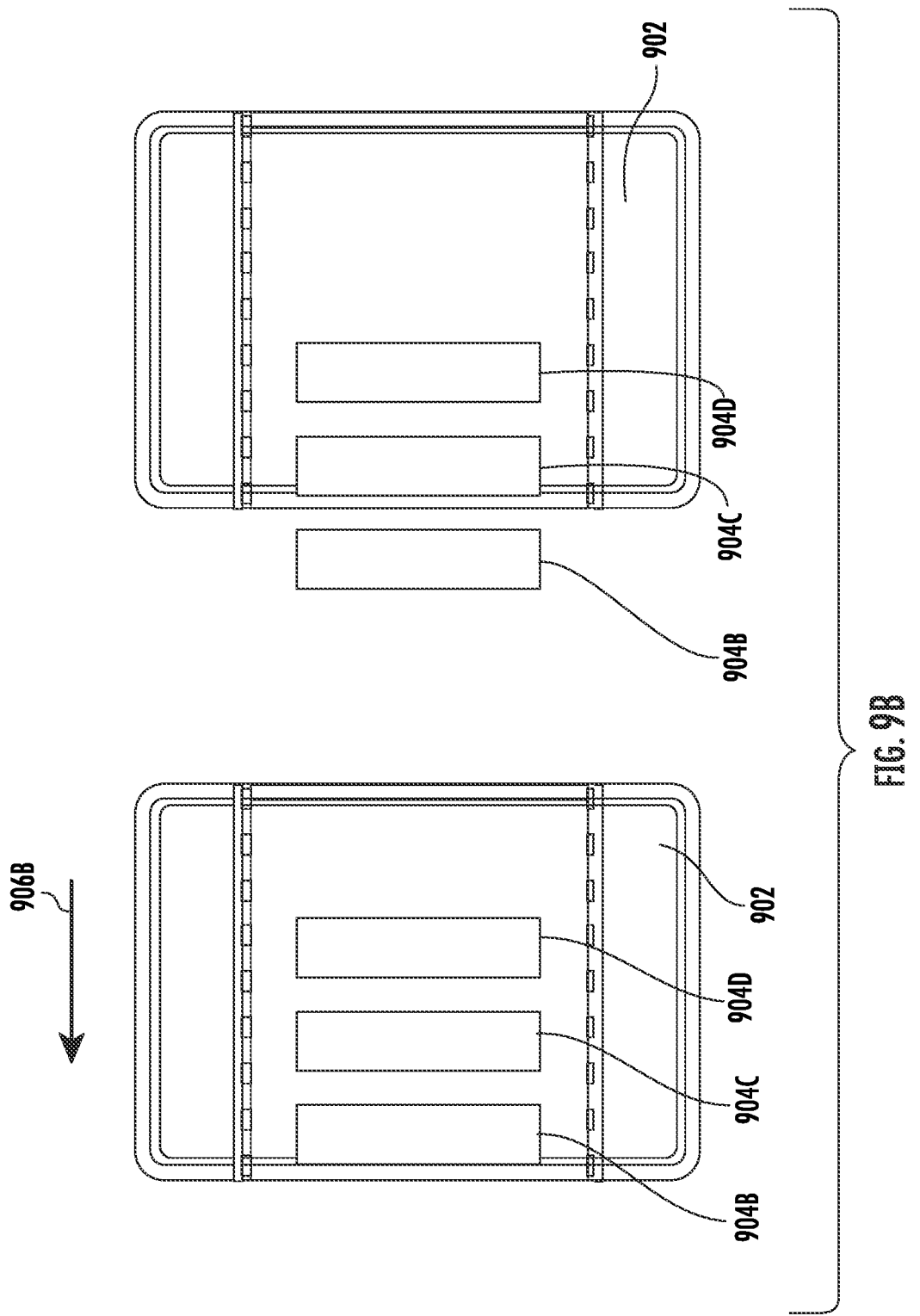

FIG. 9B illustrates the rotatable top conveyor 902 rotated to a second rotation angle after expelling the first item 904A. Specifically, the rotatable top conveyor 902 is orientated in accordance with a second rotation angle 90 degrees counterclockwise from the rotation angle depicted in FIG. 9A, such that the conveyor is activated to traverse the items in a second direction represented by the second direction 906B. The AAGV and/or associated processing circuitry thereof may activate the rotatable top conveyor 902 to cause the rotatable top conveyor 902 to begin spinning, thereby causing the remaining items 904B-904D to traverse in the second direction 906B. The item 904B may be expelled and/or otherwise launched via the rotatable top conveyor 902 in the second direction 906B, for example to another system, AAGV, and/or the like.

FIG. 9C illustrates the rotatable top conveyor 902 rotated to a third rotation angle after expelling the second item 904B. Specifically, the rotatable top conveyor 902 is orientated in accordance with a third rotation angle 90 degrees counterclockwise from the rotation angle depicted in FIG. 9B, such that the conveyor is activated to traverse the items in a third direction represented by the third direction 906C. The AAGV and/or associated processing circuitry thereof may activate the rotatable top conveyor 902 to cause the rotatable top conveyor 902 to begin spinning, thereby causing the remaining items 904C-904D to traverse in the third direction 906C. The item 904C may be expelled and/or otherwise launched via the rotatable top conveyor 902 in the third direction 906C, for example to another system, AAGV, and/or the like.

FIG. 9D illustrates the rotatable top conveyor 902 rotated to a fourth rotation angle after expelling the second item 904C. Specifically, the rotatable top conveyor 902 is orientated in accordance with a fourth rotation angle 90 degrees counterclockwise from the rotation angle depicted in FIG. 9C, such that the conveyor is activated to traverse the items in a fourth direction represented by the fourth direction 906D. The AAGV and/or associated processing circuitry thereof may activate the rotatable top conveyor 902 to cause the rotatable top conveyor 902 to begin spinning, thereby causing the remaining item 904D to traverse in the fourth direction 906D. The item 904D may be expelled and/or otherwise launched via the rotatable top conveyor 902 in the fourth direction 906D, for example to another system, AAGV, and/or the like.

In some embodiments, an AAGV activates the rotatable top conveyor 902 to any one of a particular set of predefined rotation angles (e.g., 45 degree intervals, 90 degree intervals, and/or the like). Alternatively or additionally, in some embodiments, the rotatable top conveyor 902 may be orientated to any angle of a full 360 degree spin. In this regard, an AAGV may determine any angle to which the rotatable top conveyor 902 is to be rotated. The AAGV may define rotations on an objective scale (e.g., based on a particular axis representing 0 degrees) or in other embodiments relative to the current rotational orientation of the rotatable top conveyor 902.

Example Operation and Use of Interacting AAGVs Task Operations

Having described example AAGV implementations, subsystems, apparatuses, and operations of an individual AAGV in accordance with the present disclosure, example operation and use of interacting AAGVs for performing task operations in accordance with the present disclosure will now be discussed. AAGVs may interact to enable any number of additional operations. In this regard, it will be appreciated that the particular operations performed by interacting AAGVs are merely exemplary. Additionally or alternatively, in some embodiments, other mechanisms that perform substantially the similar functions may be utilized to effectuate the same task operations. In this regard, the particular task operations depicted and described are provided as illustrative examples and not to limit the scope and/or spirit of the disclosure.

FIG. 7 illustrates alignment of a plurality of adaptive autonomous guided vehicles interacting for item relocating using a rotatable top conveyor in accordance with at least some example embodiments of the present disclosure. Specifically, FIG. 7 depicts alignment of AAGV 702A, AAGV 702B, AAGV 702C, AAGV 702D, and AAGV 702E (collectively "AAGVs 702"). Each of the AAGVs 702 includes a rotatable top rollable conveyor independently controllable from the other AAGVs. For example, the AAGV 702A includes rotatable top conveyor 704A, the AAGV 702B includes rotatable top conveyor 704B, the AAGV 702C includes rotatable top conveyor 704C, the AAGV 702D includes rotatable top conveyor 704D, and the AAGV 702E includes rotatable top conveyor 704E (collectively "rotatable top conveyors 704").

In some embodiments, one or more AAGVs includes a display affixable to the rotatable top conveyor of the AAGV. In some such embodiments, item(s) may traverse along the rotatable top conveyor and under the display. In this regard, the item(s) may traverse along the rotatable top conveyor in circumstances where such items are of sufficient height to pass under the display. Alternatively or additionally, in some embodiments, one or more AAGVs do not have a display affixed to the rotatable top conveyor, such that item(s) of any height may traverse along the rotatable top conveyor.

The AAGVs 702 are aligned such that each of their corresponding rotatable top conveyors of the rotatable top conveyors 704 are aligned in series. As illustrated, the AAGVs 702 are aligned side-by-side, with the rotatable top conveyors 704 rotated aligned in series such that item(s) may be traversed along the rotatable top conveyors 704 from one to the next. For example, as illustrated, an item 706 may be received and/or otherwise positioned on the first AAGV in the series, specifically AAGV 702A as depicted. Upon activation of the rotatable top conveyor 704A, the rotatable top conveyor 704A begins to spin towards the first direction 708, thus causing the item 706 to traverse in the first direction 708. The item 706 may transfer from the rotatable top conveyor 704A to the rotatable top conveyor 704B. The AAGV 702B may activate the rotatable top conveyor 704B upon detecting the item 706. Alternatively or additionally, in some embodiments, the AAGV 702B activates the rotatable top conveyor 704B upon reaching the target location in the serial arrangement of AAGVs 702. For example, in some embodiments, the AAGVs 702 each activate their respective rotatable top conveyor of the rotatable top conveyors 704 at the same time or upon the same condition (e.g., upon reaching a target location), or activates their respective rotatable top conveyor of the rotatable top conveyors 704 at different times and/or upon occurrence of different conditions.

In some embodiments, the rotatable top conveyors 704 of the AAGVs 702 remain activated to transport the item 706 from a starting location to a target location utilizing each of the rotatable top conveyors 704. For example, the item 706 may be placed (e.g., manually or automatically by another system, not depicted) on the rotatable top conveyor 704A for transportation to a target location located past the AAGV 702E in the direction 708. In this regard, each of the rotatable top conveyors 704 may be activated to cause the item 706 to traverse along top of each of the rotatable top conveyors 704 and be offboarded and/or otherwise expelled from the final rotatable top conveyor (e.g., the rotatable top conveyor 704E as depicted) to reach the target location. It will be appreciated that, by arranging the AAGVs 702 in series from a starting location to a target location, each of the AAGVs 702 need not individually travel from the starting location to the target location to transport one or more items. Instead, each item may traverse along the rotatable top conveyors 704 to reach the target location more efficiently and without delays caused by waiting for each individual AAGV to receive and/or onboard one or more items before moving from a start location to enable the next individual AAGV to approach the start location.

A series and/or other arrangement of AAGVs may be utilized for any of a myriad of purposes. For example, in some embodiments, a number of AAGVs may be arranged in series across a particular distance, but may not span the entire distance between a starting location (e.g., at which items are onboarded) and a target location (e.g., at which items are offboarded). In some such circumstances, items may be positioned along the rotatable top conveyors 704 for transportation. In this regard, the arrangement of AAGVs may maneuver in conjunction with one another until the AAGV closest to the target location. In this regard, the total required movement by each AAGV is reduced to allow transportation of items from a starting location to the target location. As illustrated for example, the target location may be located further to the right than the AAGV 702E. In this regard, a plurality of items may be positioned along the rotatable top conveyors 704, and the AAGVs 702 may each maneuver in the direction 708 until the AAGV 702E reaches the target location, thus reducing the total movement that would otherwise be required by each of the AAGVs 702 individually. Such reduced movement conserves resources that would otherwise be expended to cause the AAGVs to each move independently for the entire distance between the starting location and the target location. Additionally or alternatively, in some such embodiments, the AAGVs 702 may be moved utilizing the same control instructions, simplifying the required process for generating instructions and reducing the likelihood that individual AAGVs crash into one another during operation.

In other embodiments, the AAGVs 702 may be arranged in any direction and/or face any direction to minimize subsequent movement. For example, in some contexts each of the AAGVs 702 may be aligned in a forward-facing alignment, such that each of the base vehicles of the AAGVs 702 face the direction 708 together with each of the rotatable top conveyors 704A-704E. It will be appreciated that each of the AAGVs 702 may be arranged in any direction that enables the AAGVs 702 to each initiate movement towards a target location upon completion of one or more action(s) utilizing the rotatable top conveyor and/or vertical carousel, for example. In some embodiments, for example where the AAGVs 702 each move in the same direction, the AAGVs 702 may all face the same direction. In other embodiments, for example where the AAGVs 702 may receive item(s) and deliver such item(s) to different target location(s) before returning to the arrangement as illustrated, one or more of the AAGVs 702 may face an alternative direction from one or more of the remaining AAGVs 702.

In some embodiments, the arrangement of AAGVs 702 utilizes the rotatable top conveyors of each AAGV to form any desired shape and/or size arrangement. In this regard, item(s) may be received at a starting point of the arrangement and transferred between AAGVs until such item(s) reach the final AAGV in the arrangement. For example, in some embodiments, a plurality of AAGVs are arranged to form a linear arrangement depicted by 752A. In other embodiments, a plurality of AAGVs are arranged to form the curved arrangement depicted by 752B. In yet other embodiments, a plurality of AAGVs are arranged to form an "S"-arrangement depicted by 752C. AAGVs may align themselves and/or receive instructions for aligning one another (e.g., from a central system that controls operations of all AAGVs) in any desired arrangement, for example to increase efficiency and/or speed of operations being performed, to span across a particular distance in an environment, circumvent obstructions in the environment, and/or the like.

In this regard, it will be appreciated that dependent on where a particular AAGV is located in the arrangement, the rotatable top conveyor corresponding to the particular AAGV may be rotated to a particular angle that continues the arrangement 752B. In some embodiments, an AAGV receives the location at which it is to position itself as well as the angle at which to rotate its rotatable top conveyor. In other embodiments, the AAGV determines and/or generates (e.g., via sensor data captured onboard the AAGV) the location at which the AAGV is to position itself and/or the angle at which to rotate its rotatable top conveyor. For example, the AAGV may determine where it is located in the arrangement and determine a next location of the arrangement, and orient itself such that it is aligned with the previous AAGV in the arrangement and rotate the rotatable top conveyor towards the location of the next AAGV in the arrangement.

In other embodiments, other mechanism(s) of the AAGV may be used in an arrangement style to enable interaction between AAGVs. For example, in some embodiments, AAGVs align for onboarding and/or transfer of item(s) between vertical carousel(s) of the AAGVs. For example, the vertical carousel of each AAGV may be utilized to form an extended conveyor belt by transferring an item from one carousel conveyor shelf of a first AAGV to a carousel conveyor shelf of a second AAGV. Such operation may perform simultaneously with, alternative to, or otherwise in addition to the operation of the rotatable top conveyors for each AAGV. In some embodiments, for example, multiple mechanisms are utilized to increase the throughput at which each AAGV may onboard items. Additionally, such operations enables the AAGV to be operated in any manner according to a desired task operation to be performed by the AAGV and/or multiple AAGVs.

In some embodiments, it will be appreciated that multiple arrangements of AAGVs may interact with one another. For example, in some embodiments, multiple arrangements of AAGVs may align with one or more AAGVs connecting the individual arrangements. In one example context, multiple arrangements of AAGVs are arranged for sorting. A first AAGV in line with one or more arrangements may be configured to rotate its rotatable top conveyor to transfer item(s) to a particular arrangement of AAGVs, for example based at least in part on a determined type of item onboarded. In one example context, the first AAGV sorts items as they are received, such that different item types are traversed towards a first direction for a first item type, a second direction for a second item type, and so on. AAGVs may arrange themselves into a matrix that enables such sorting into different arrangements of AAGVs. For example, a first row of AAGVs may be associated with onboarding and/or transporting items of a first type, a second row of AAGVs may be associated with onboarding and/or transporting items of a second type, and a third row of AAGVs may be associated with onboarding and/or transporting items of a third type. Such arrangements may share one or more AAGVs that rotate to traverse item(s) to particular rows of the matrix. For example, in some embodiments, a first AAGV receives item(s) from a separate loading conveyor and/or manual loader, determines and/or detects the type of item received, and rotates to a first rotation (e.g., facing up from the AAGV) towards a first row of AAGVs for a first item type, rotates to a second rotation (e.g., facing forward from the AAGV) towards a second row of AAGVs for a second item type, and/or rotates to a third rotation (e.g., facing down from the AAGV) towards a third row of AAGVs for a third item type. In this regard, once offloaded to the appropriate arrangement of AAGVs for a particular item type, the particular arrangement of AAGVs that receives the item may proceed to transport the item to a particular target location corresponding to the item type or particular item.

FIG. 8 illustrates alignment of a plurality of adaptive autonomous guided vehicles interacting for item relocating using forklift arms in accordance with at least some example embodiments of the present disclosure. Specifically, FIG. 8 illustrates a plurality of AAGVs 802A, 802B, and 802C (collectively "AAGVs 802") interacting with one another to interact with a pallet item 808 for relocating said pallet item 808. As depicted, each of the AAGVS 802A include only a base vehicle including retractable forklift arms 806A, 806B, and 806C respectively. In one example context, each of the AAGVs 802A is rated for and/or otherwise associated with a maximum weight threshold for loading items via its corresponding retractable forklift arms. In a circumstance where an AAGV attempts to onboard an item via its retractable forklift arms (e.g., AAGV 802B attempts to load the item 808 via the retractable forklift arms 806B) and detects that the item 808 exceeds the maximum weight threshold corresponding to the AAGV 802B, the AAGV 802B may request or be assigned (e.g., via a central system) assistance in interacting with the item 808 from other AAGVs. In this regard, some or all other AAGVs may receive instructions and/or otherwise generate instructions to interact with the AAGV 802B to onboard and/or relocate the item 808.

In some embodiments, the AAGVs nearest the AAGV 802B receive instructions and/or generate instructions for relocating to target location(s) that enable interaction with the item 808 together with the AAGV 802B. Alternatively or additionally, in some embodiments, certain AAGVs receive and/or generate such instructions. For example, in some embodiments, AAGVs are identified that alone or in combination enable interaction with the item 808 based on the combination of maximum weight thresholds for each of the AAGVs interacting with one another. In this regard, the AAGV 802A and the AAGV 802C in combination may enable onboarding of the item 808 while simultaneously satisfying the maximum weight threshold for each of the AAGVs 802A, 802B, and 802C. Accordingly, the AAGVs 802A and 802C may relocate to their depicted target positions with retractable forklift arms 806A and 806C extended to interact with the item 808. The AAGVs 802A, 802B, and 802C may subsequently traverse to one or more new target locations with the item 808 (e.g., to reposition the item 808 to an intended target location) and offload the item 808. Upon completion of this task operation, the AAGVs 802A, 802B, and 802C may continue to interact with one another to complete one or more other task operation(s) and/or may perform other task operation(s) individually.

In some embodiments, the AAGV utilizes the retractable forklift arms for interacting with an item as depicted and described. It will be appreciated that, in circumstances where the retractable forklift arms are part of a base vehicle of the AAGV, the AAGV may utilize the retractable forklift arms to interact with one or more items in any state of construction and/or deconstruction. For example, in some embodiments, an AAGV embodied by solely a base vehicle may utilize retractable forklift arms for one or more interaction(s). In other embodiments, an AAGV including a base vehicle, vertical carousel, rotatable top conveyor, and/or display may similarly utilize retractable forklift arms for one or more interact(s).

An AAGV that includes only a base vehicle may perform interactions in other manners utilizing the top of one or more AAGVs. For example, with respect to FIG. 8, one or more of the tops of AAGV 802A, 802B, and/or 802C may be utilized to interact with the item 808. In this regard, AAGV 802A (for example) may traverse under the item 808 such that the item 808 engages the top 804A of the AAGV 802A. The AAGV 802A may decrease its height off the ground (e.g., utilizing hydraulics or other known mechanisms) to traverse under the item 808, and subsequently increase its height off the ground to engage the item 808 once the target location is reached and the item 808 is positioned over the top 804A of the AAGV 802A. In some such example contexts, an AAGV may engage an item using the top of the AAGV without use of the retractable forklift arms for such an AAGV. It will be appreciated that the other AAGVs may simultaneously engage the item 808 with retractable forklift arms and/or the top of their respective base vehicles.

Example AAGV Optimization Processes of the Disclosure

Having described example AAGV implementations, subsystems, apparatuses, operations of an individual AAGV, and operation and use of interacting AAGVs in accordance with the present disclosure, example optimizations for AAGV operations in accordance with the present disclosure will now be discussed. In this regard, an AAGV may be optimized to increase efficiency, reduce errors in operation, avoid crashes, drops, and/or destruction of the AAGV and/or items interacted with by the AAGV. It will be appreciated that an AAGV may utilize any of its mechanisms as described herein to perform one or more optimizations during and/or in preparation for performing one or more task operation(s). In this regard, the particular optimizations depicted and described herein are provided as illustrative examples and not to limit the scope and/or spirit of the disclosure.

FIGS. 10A and 10B each illustrate a view of an adaptive autonomous guided vehicle during auto-balancing of an adaptive autonomous guided vehicle to a balanced center of gravity based at least in part on a current load distribution applied to the vertical carousel in accordance with at least some example embodiments of the present disclosure. Specifically, FIG. 10A depicts an example AAGV 1000 at initiation of an example process for auto-balancing in preparation for transport of a plurality of items 1004A-1004F. FIG. 10B depicts the example AAGV 1000 after completion of the example process for auto-balancing in preparation for transport of the plurality of items 1004A-1004F.

As depicted in FIG. 10A, the AAGV 1000 includes each of a plurality of items 1004A, 1004B, 1004C, 1004D, 1004E, and 1004F (collectively "items 1004") each positioned on the same side of a plurality of carousel conveyor shelves 1002A, 1002B, 1002C, 1002D, 1002E, and 1002F (collectively "carousel conveyor shelves 1002"). Each of the items 1004 exerts a particular force upon the particular carousel conveyor shelf where the item is located. In this regard, the items 1004 alter the center of gravity based on the current load distribution corresponding to the collective force applied for each of the items 1004 on the carousel conveyor shelves 1002. In a circumstance where the center of gravity for the AAGV is shifted sufficiently based on the current load distribution, the AAGV may be at risk for tipping and/or dropping one or more items of the 1004 during initial movement of the AAGV 1000. For example, the force required to begin moving the base vehicle of the AAGV 1000, and/or one or more tires thereof for example the right side tire most impacted by the current load distribution) may "jolt" the AAGV or otherwise move the AAGV 1000 such that one or more of the items 1004 fall or are otherwise forced off its corresponding carousel conveyor shelf (e.g., due at least in part to the inertia of the items 1004). Alternatively or additionally, in some embodiments, the items 1004 may apply a current load distribution that may cause deterioration and/or destruction of the vertical carousel of the AAGV 1000 if continuously applied.

In some embodiments, the AAGV 1000 initiates an auto-balancing process automatically upon completion of onboarding one or more items, such as the items 1004. In some embodiments, the AAGV 1000 initiates an auto-balancing process upon detecting one or more conditions is/are satisfied. For example, in some embodiments, the AAGV 1000 monitors a current load distribution caused by the items currently onboard the AAGV 1000. In some embodiments, the AAGV 1000 may include one or more load cell(s) associated with each of the carousel conveyor shelve(s), and/or separate ends of a carousel conveyor shelf, that determine whether a load is applied to one or more position(s) along the carousel conveyor shelf. Based on the real-time sensor data read out from the load cell(s), processing circuitry of the AAGV 1000 may determine a current load along each of the carousel conveyor shelves, and/or a current load distribution associated with the entirety of the vertical carousel. In some such embodiments, the AAGV determines whether the current load distribution alters the center of gravity of the AAGV to a position outside of an allowed range (e.g., from a default center of gravity when no load is applied to the carousel conveyor shelves of the AAGV 1000). Alternatively or additionally still, in some embodiments, the AAGV 1000 determines whether a weight differential threshold (e.g., how much more weight one side of a vertical carousel may have as opposed to the other side) is satisfied based on the current positions of items 1004 onboard the AAGV 1000. In some such embodiments, the AAGV initiates the onboarding process only in circumstances where such conditions are satisfied. In other embodiments, the AAGV 1000 initiates an auto-balancing process before initiating any traversal of the AAGV 1000.

The auto-balancing process repositions one or more of the items 1004 to a new position in the vertical carousel of the AAGV 1000. By repositioning the one or more of the items 1004, the current load distribution applied to the vertical carousel is altered based on the new positions of the one or more items. In some embodiments, the current load distribution is altered such that the current load distribution is balanced to match, and/or approach (e.g., as much as possible based on the current items onboard the AAGV 1000 and/or positions of each item), a default center of gravity for the AAGV 1000. In some embodiments, the auto-balancing process redistributes one or more items such that the current load distribution applied to each side of the vertical carousel matches, is within a maximum differential threshold, and/or is as close to balanced as possible. In some embodiments, and for ease of explanation as will be described, each item may apply the same load (e.g., may be the same size, include the same weight, and/or the like). In other embodiments, it will be appreciated that each item may apply a different load, such that the AAGV utilizes one or more onboard sensor(s)

and/or data received associated with such items to determine the current load distribution and/or alter it during auto-rebalancing.

As depicted in FIG. 10B, the AAGV 1000 performs auto-rebalancing by altering the position of each item positioned on the vertical carousel. For example, the items have each been repositioned counterclockwise such that each item is stored on opposite sides of another item on a single carousel conveyor shelf. In this regard, it will be appreciated that the load applied by each item is balanced by the load of the item on the other end of the carousel conveyor shelf. Specifically, as depicted, the AAGV repositions the item 1004A to the left end of the carousel conveyor shelf 1002C, opposite the item 1004F to the right end of the carousel conveyor shelf 1002C. Similarly, the item 1004B is positioned to the left end of the carousel conveyor shelf 1002B while item 1004E is positioned on the right end of the carousel conveyor shelf 1002C, and the item 1004C is positioned to the left end of the carousel conveyor shelf 1002A while the item 1004D is positioned to the right end of the carousel conveyor shelf 1002A. In a context where each item applies the same and/or similar load, the depicted positioning of items 1004 alters the current load distribution to be balanced around a default center of gravity in line with the belt mechanism of the vertical carousel. It will be appreciated that the AAGV may detect and/or otherwise retrieve a default center of gravity and/or acceptable range within which the detected and/or otherwise determined center of gravity is located based on the current load distribution. In some embodiments, once the current center of gravity is determined balanced for the current load distribution (e.g., within the acceptable range or matching the default center of gravity, or the like), the AAGV may initiate movement via one or more control instruction(s). In some embodiments, the changes in the current load distribution and/or center of gravity of the AAGV 1000 caused thereby is monitored utilizing the one or more load cell(s) and/or positions of the carousel conveyor shelves as the carousel conveyor shelves rotate around the vertical carousel.

Example Processes of the Disclosure

Having described example AAGV implementations, subsystems, apparatuses, operations of an individual AAGV, operation and use of interacting AAGVs, and optimizations for AAGV operations in accordance with the present disclosure, example processes for controlling an AAGV in accordance with the present disclosure will now be discussed. It will be appreciated that each of the flowcharts depicts an example computer-implemented process that may performed by one or more of the apparatuses, systems, devices, and/or computer program products described herein, for example using one or more of the specially configured components thereof. The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 11 illustrates a flowchart including operations for serial alignment of a plurality of adaptive autonomous guided vehicles in accordance with at least some example embodiments of the present disclosure. Specifically, FIG. 11 illustrates operations of an example process 1100. In some embodiments, the example process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the AAGV control apparatus 300 alone or in communication with one or more other component(s), device(s), system(s), and/or the like. In this regard, in some such embodiments, the AAGV control apparatus 300 is specially configured by computer-coded instructions (e.g., computer program instructions) stored thereon, for example in the memory 304 and/or another component depicted and/or described herein and/or otherwise accessible to the AAGV control apparatus 300, for performing the operations as depicted and described. In some embodiments, the AAGV control apparatus 300 is in communication with one or more external apparatus(es), system(s), device(s), and/or the like, to perform one or more of the operations as depicted and described. For example, the AAGV control apparatus 300 may be in communication with any number of real-time sensor(s), data-controlled robots, other computing device(s), and/or the like. For purposes of simplifying the description, the process 1100 is described as performed by and from the perspective of AAGV control apparatus 300, for example embodying a subsystem of an AAGV for operating within an environment.

The process 1100 begins at operation 1102. At operation 1102, AAGV control apparatus 300 includes means, such as the processing circuitry 302, memory 304, input/output circuitry 306, communications circuitry 308, guided control circuitry 310, and/or the like, or a combination thereof, to receive control instructions for aligning with one or more other AAGVs. In some embodiments, the control instructions are received from an external system, for example a central system that organizes and/or otherwise controls a plurality of AAGVs within a particular environment. In other embodiments, the control instructions are received based at least in part on a task operation assigned to the AAGV control apparatus 300. In some embodiments, the control instructions are received by processing real-time sensor data and generating such control instructions based at least in part on the real-time sensor data (e.g., to detect task operations to be performed, other AAGVs in the way of a target location, and/or the like).

At operation 1104, AAGV control apparatus 300 includes means, such as the processing circuitry 302, memory 304, input/output circuitry 306, communications circuitry 308, guided control circuitry 310, and/or the like, or a combination thereof, to capture a data set representing an environment. In some embodiments, some or all of the data set is captured via real-time sensors onboard the AAGV. In some embodiments, some or all of the data set is received via external real-time sensors of the AAGV, for example over one or more communications network(s).

At operation 1106, AAGV control apparatus 300 includes means, such as the processing circuitry 302, memory 304, input/output circuitry 306, communications circuitry 308, guided control circuitry 310, and/or the like, or a combination thereof, to process the data set to maneuver in alignment with a first AAGV of the one or more other AAGVs. In some embodiments, the data set is processed to generate control instructions for activating particular components of the AAGV to effectuate such maneuver(s). For example, the data set may be processed to generate a perception of the environment and generate control instructions that proceed towards a target location without crashing and/or interfering with other AAGVs, entities, and/or object(s) depicted in the perception of the environment. As the AAGV reaches a target position and detects an AAGV currently in alignment, the AAGV control apparatus 300 may specifically generate control instructions to maneuver around the detected AAGV currently in alignment. For example, in embodiments, the AAGV control apparatus 300 maneuvers the AAGV to align side-by-side and/or in a forward-facing alignment with the detected AAGV. In this regard, the AAGV control apparatus 300 may process the data set to generate control instructions that maneuver the AAGV to be in alignment based on the current location and orientation of the detected AAGV perceived via the data set.

At operation 1108, AAGV control apparatus 300 includes means, such as the processing circuitry 302, memory 304, input/output circuitry 306, communications circuitry 308, guided control circuitry 310, and/or the like, or a combination thereof, to activate a rotatable top conveyor. The rotatable top conveyor may be activated to rotate the rotatable top conveyor to a particular rotation in line with the previous AAGV and/or a subsequent AAGV of the one or more other AAGVs. Alternatively or additionally, in some embodiments, the rotatable top conveyor is activated to begin spinning in a particular direction (e.g., in accordance with the alignment). In this regard, the rotatable top conveyor may be used to transfer item(s) based on the alignment of AAGVs. Alternatively, in some embodiments, the rotatable top conveyor is activated to transfer items to other AAGVs forming individual alignments, for example for purposes of sorting items between various arrangements of AAGVs.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An adaptive autonomous guided vehicle comprising:
   a base vehicle;
   a vertical carousel comprising at least one carousel conveyor shelf, the vertical carousel affixable to a top of the base vehicle;
   a rotatable top conveyor affixable to a top of the vertical carousel, wherein the rotatable top conveyor is configured to rotate in a plurality of directions to expel objects to a plurality of systems, and wherein the rotatable top conveyor rotates independently from the base vehicle and the vertical carousel; and
   processing circuitry communicatively coupled with each of the base vehicle, the vertical carousel, and the rotatable top conveyor, wherein the processing circuitry executes computer-coded instructions that at least partially cause the processing circuitry to control each of the base vehicle, the vertical carousel, and the rotatable top conveyor.

2. The adaptive autonomous guided vehicle according to claim 1, the processing circuitry further caused to:
   receive control instructions to align with at least one other adaptive autonomous guided vehicle; and
   align the rotatable top conveyor of the adaptive autonomous guided vehicle with at least one other rotatable top conveyor of the at least one other adaptive autonomous guided vehicle by at least utilizing the base vehicle to position the adaptive autonomous guided vehicle at a target position.

3. The adaptive autonomous guided vehicle according to claim 2, wherein the target position indicates a position in side-by-side alignment with the at least one other adaptive autonomous guided vehicle side-by-side.

4. The adaptive autonomous guided vehicle according to claim 2, wherein the target position indicates a position in forward-facing alignment with the at least one other adaptive autonomous guided vehicle.

5. The adaptive autonomous guided vehicle according to claim 2, wherein to align the rotatable top conveyor of the adaptive autonomous guided vehicle with the at least one other rotatable top conveyor of the at least one other adaptive autonomous guided vehicle, the processing circuitry is further caused to:

rotate the rotatable top conveyor to a target rotation.

6. The adaptive autonomous guided vehicle according to claim 2, the adaptive autonomous guided vehicle further comprising at least one environment sensor, each environment sensor of the at least one environment sensor housed in or fixedly attached to the base vehicle, the vertical carousel, or the rotatable top conveyor, and wherein the processing circuitry is further caused to:

retrieve real-time sensor data from the at least one environment sensor; and generate control instructions for the base vehicle based at least in part on the real-time sensor data.

7. The adaptive autonomous guided vehicle according to claim 1, the processing circuitry further caused to:

manipulate the vertical carousel to position the at least one carousel conveyor shelf based at least in part on a balanced center of gravity determined for a current load distribution applied to the vertical carousel.

8. The adaptive autonomous guided vehicle according to claim 1, the adaptive autonomous guided vehicle further comprising:

a display fixedly attached to the rotatable top conveyor, such that there is a gap between the display and the rotatable top conveyor, wherein the gap defines an area through which an object traverses along the rotatable top conveyor.

9. The adaptive autonomous guided vehicle according to claim 1, wherein the processing circuitry is communicatively coupled with a display to cause output of display data via the display.

10. The adaptive autonomous guided vehicle according to claim 1, wherein each carousel conveyor shelf of the at least one carousel conveyor shelf comprises an unobstructed space between a first end of the carousel conveyor shelf and a second end of the carousel conveyor shelf.

11. The adaptive autonomous guided vehicle according to claim 1, wherein each carousel conveyor shelf of the at least one carousel conveyor shelf comprises an extendable slide controlled by a motor.

12. The adaptive autonomous guided vehicle according to claim 1, wherein the base vehicle comprises forklift arms.

13. The adaptive autonomous guided vehicle according to claim 1, wherein the processing circuitry is further caused to:

align a first carousel conveyor shelf of the vertical carousel with a second carousel conveyor shelf of a second vertical carousel of another adaptive autonomous guided vehicle; and activate the first carousel conveyor shelf to traverse an object engaged with the first carousel conveyor shelf to the second carousel conveyor shelf.

14. The adaptive autonomous guided vehicle according to claim 1, wherein the processing circuitry is further caused to:

rotate a first carousel conveyor shelf of the vertical carousel to a particular rotation;

align the first carousel conveyor shelf of the vertical carousel with a target position; and activate the first carousel conveyor shelf to traverse an object engaged with the first carousel conveyor shelf to the target position.

15. The adaptive autonomous guided vehicle according to claim 1, wherein the base vehicle comprises retractable forklift arms, and wherein the processing circuitry is further caused to:

control the base vehicle to engage at least one object utilizing the retractable forklift arms;

determine the at least one object impedes at least one space associated with the vertical carousel; and control the adaptive autonomous guided vehicle for offloading the at least one object engaged by the retractable forklift arms before offloading a second at least one object engaged by the vertical carousel.

16. The adaptive autonomous guided vehicle according to claim 1, wherein the base vehicle comprises retractable forklift arms, and wherein the processing circuitry is further caused to:

control the base vehicle to engage at least one object utilizing the retractable forklift arms;

determine the at least one object impedes at least one space associated with the vertical carousel; and rotate the vertical carousel to position the at least one carousel conveyor shelf aligned with an unobstructed space.

17. The adaptive autonomous guided vehicle according to claim 1, wherein the processing circuitry is further caused to:

detect an object engaged at a first end of a first carousel conveyor shelf;

activate the first carousel conveyor shelf to traverse the object towards a second end of the first carousel conveyor shelf; and extend a first extendable slide at the second end of the first carousel conveyor shelf, wherein the object traverses along the first extendable slide during offloading from the first extendable slide.

18. The adaptive autonomous guided vehicle according to claim 1, wherein the processing circuitry is further caused to:

control the base vehicle to traverse to a reconfiguration location; and cause activation of a reconfiguration system, wherein the reconfiguration system engages the adaptive autonomous guided vehicle to remove the rotatable top conveyor and/or the vertical carousel.

19. An adaptive autonomous guided vehicle comprising:

a base vehicle comprising retractable forklift arms;

a vertical carousel comprising at least one carousel conveyor shelf, the vertical carousel affixable to a top of the base vehicle;

a rotatable top conveyor affixable to a top of the vertical carousel;

at least one environment sensor, each environment sensor of the at least one environment sensor housed in or fixedly attached to the base vehicle, the vertical carousel, or the rotatable top conveyor; and processing circuitry communicatively coupled with each of the base vehicle, the vertical carousel, and the rotatable top conveyor, wherein the processing circuitry is configured to:

rotate the rotatable top conveyor to a first direction associated with a first object type;

activate the rotatable top conveyor to traverse a first object in a first direction towards a first system;

rotate the rotatable top conveyor to a second direction associated with a second object type; and activate the rotatable top conveyor to traverse a second object in a second direction towards a second system, wherein the rotatable top conveyor rotates independently from the base vehicle and the vertical carousel.

20. An adaptive autonomous guided vehicle comprising:
a base vehicle comprising retractable forklift arms;
a vertical carousel comprising at least one carousel conveyor shelf, the vertical carousel affixable to a top of the base vehicle;
a rotatable top conveyor affixable to a top of the vertical carousel, wherein the rotatable top conveyor is configured to rotate in a plurality of directions to expel objects to a plurality of systems, and wherein the rotatable top conveyor rotates independently from the base vehicle and the vertical carousel;
at least one environment sensor, each environment sensor of the at least one environment sensor housed in or fixedly attached to the base vehicle, the vertical carousel, or the rotatable top conveyor; and
processing circuitry communicatively coupled with each of the base vehicle, the vertical carousel, and the rotatable top conveyor, wherein the processing circuitry is configured to:
retrieve real-time sensor data from the at least one environment sensor;
apply the real-time sensor data to a perception model; and
at least partially control each of the base vehicle, the vertical carousel, and/or the rotatable top conveyor based at least in part on applying the real-time sensor data to the perception model.

* * * * *